United States Patent
Wirola et al.

(10) Patent No.: US 11,363,462 B2
(45) Date of Patent: Jun. 14, 2022

(54) CROWD-SOURCING OF POTENTIALLY MANIPULATED RADIO SIGNALS AND/OR RADIO SIGNAL PARAMETERS

(71) Applicant: HERE GLOBAL B.V., Eindhoven (NL)

(72) Inventors: Lauri Aarne Johannes Wirola, Tampere (FI); Jari Syrjarinne, Tampere (FI)

(73) Assignee: HERE GLOBAL B.V., Eindhoven (NL)

( * ) Notice: Subject to any disclaimer, the term of this patent is extended or adjusted under 35 U.S.C. 154(b) by 0 days.

(21) Appl. No.: 16/723,620

(22) Filed: Dec. 20, 2019

(65) Prior Publication Data

US 2020/0205004 A1 Jun. 25, 2020

(30) Foreign Application Priority Data

Dec. 20, 2018 (EP) ..................... 18214718

(51) Int. Cl.
*H04W 12/12* (2021.01)
*H04W 4/029* (2018.01)

(52) U.S. Cl.
CPC ........... *H04W 12/12* (2013.01); *H04W 4/029* (2018.02)

(58) Field of Classification Search
CPC ..... H04W 12/12; H04W 4/029; G01S 5/0252; G01S 5/0242
See application file for complete search history.

(56) References Cited

U.S. PATENT DOCUMENTS

| | | | |
|---|---|---|---|
| 6,049,333 A | 4/2000 | LaJoie et al. |
| 6,448,925 B1 | 9/2002 | Shridhara |
| 6,501,956 B1 | 12/2002 | Weeren et al. |
| 7,305,232 B2 | 12/2007 | Ono et al. |
| 7,312,752 B2 | 12/2007 | Smith et al. |
| 7,574,202 B1 | 8/2009 | Tsao et al. |

(Continued)

FOREIGN PATENT DOCUMENTS

| | | |
|---|---|---|
| CN | 106597363 A | 4/2017 |
| EP | 2 746 813 A1 | 6/2014 |

(Continued)

OTHER PUBLICATIONS

Notice of Allowance for U.S. Appl. No. 16/723,721 dated Nov. 16, 2020.

(Continued)

*Primary Examiner* — Marisol Figueroa
(74) *Attorney, Agent, or Firm* — Alston & Bird LLP

(57) ABSTRACT

A method is disclosed that includes obtaining one or more pieces of spoofing information indicative of a data set enabling positioning based on radio signals sent by a respective radio node. The data set is further indicative of one or more parameters based on which said positioning is performed and/or controlled and which is considered to be at least partially unexpected. The method further includes aggregating spoofing information based on the one or more parameters of the respective data set of the one or more pieces of spoofing information; and providing at least a part of the aggregated spoofing information for usage in a positioning. A corresponding apparatus, computer-readable storage medium and system are also disclosed.

20 Claims, 5 Drawing Sheets

(56) References Cited

U.S. PATENT DOCUMENTS

| | | | |
|---|---|---|---|
| 7,716,740 B2 | 5/2010 | Robert et al. |
| 7,788,382 B1 | 8/2010 | Jones et al. |
| 7,859,462 B2 | 12/2010 | Small |
| 7,970,894 B1 | 6/2011 | Patwardhan |
| 8,571,578 B1 | 10/2013 | Chen et al. |
| 8,655,312 B2 | 2/2014 | Stahlberg et al. |
| 8,750,267 B2 | 6/2014 | Aggarwal et al. |
| 8,805,403 B2 | 8/2014 | Curticapean et al. |
| 9,113,291 B2 | 8/2015 | Venkatraman et al. |
| 9,167,386 B2 | 10/2015 | Valaee et al. |
| 9,258,713 B2 | 2/2016 | Rangarajan et al. |
| 9,301,100 B1 | 3/2016 | Jampani et al. |
| 9,374,709 B2 | 6/2016 | Peirce et al. |
| 9,420,430 B2 | 8/2016 | Wuoti et al. |
| 9,466,881 B1 | 10/2016 | Berry et al. |
| 9,503,864 B1 | 11/2016 | Chao et al. |
| 9,544,798 B1 | 1/2017 | Ahmadzadeh et al. |
| 9,794,753 B1 | 10/2017 | Stitt et al. |
| 9,849,978 B1 | 12/2017 | Carmack et al. |
| 9,867,039 B2 | 1/2018 | Wang et al. |
| 9,886,850 B2 | 2/2018 | Benhammou |
| 10,149,159 B1 | 12/2018 | Perfitt |
| 10,382,890 B1 | 8/2019 | Stirling |
| 10,511,392 B2 | 12/2019 | Khalajmehrabadi et al. |
| 10,530,486 B2 | 1/2020 | Aoyama et al. |
| 10,531,423 B1 | 1/2020 | Hassan et al. |
| 10,841,746 B2 | 11/2020 | Eashwaramoorthy |
| 2005/0041634 A1 | 2/2005 | Aura |
| 2006/0240840 A1 | 10/2006 | Morgan et al. |
| 2007/0049323 A1 | 3/2007 | Wang et al. |
| 2009/0075630 A1 | 3/2009 | McLean |
| 2009/0088132 A1 | 4/2009 | Politowicz |
| 2010/0120422 A1 | 5/2010 | Cheung et al. |
| 2011/0009132 A1 | 1/2011 | Skarby et al. |
| 2011/0065450 A1 | 3/2011 | Kazmi |
| 2011/0131651 A1 | 6/2011 | Shanmugavadivel et al. |
| 2011/0154050 A1 | 6/2011 | Cordery et al. |
| 2012/0056785 A1 | 3/2012 | Jovicic et al. |
| 2013/0170378 A1 | 7/2013 | Ray et al. |
| 2013/0196674 A1 | 8/2013 | Dong |
| 2013/0252631 A1 | 9/2013 | Alizadeh-Shabdiz et al. |
| 2013/0303185 A1 | 11/2013 | Kim et al. |
| 2013/0310066 A1 | 11/2013 | Shu et al. |
| 2013/0310068 A1* | 11/2013 | Fischer .................. G01S 19/05 455/456.1 |
| 2013/0336138 A1 | 12/2013 | Venkatraman et al. |
| 2014/0130155 A1 | 5/2014 | An et al. |
| 2014/0150049 A1 | 5/2014 | Kwon et al. |
| 2014/0256348 A1 | 9/2014 | Wirola et al. |
| 2014/0259047 A1 | 9/2014 | Bakar et al. |
| 2014/0344946 A1 | 11/2014 | Ward et al. |
| 2015/0050947 A1 | 2/2015 | Wirola et al. |
| 2015/0065166 A1 | 3/2015 | Ward et al. |
| 2015/0172289 A1 | 6/2015 | Kwon et al. |
| 2015/0215762 A1 | 7/2015 | Edge |
| 2015/0226858 A1* | 8/2015 | Leibner ................. G01S 19/215 342/357.59 |
| 2015/0247916 A1 | 9/2015 | Bartov et al. |
| 2015/0257179 A1 | 9/2015 | Kim et al. |
| 2015/0334676 A1 | 11/2015 | Hart et al. |
| 2015/0351017 A1 | 12/2015 | Wirola et al. |
| 2015/0381740 A1 | 12/2015 | Gwin et al. |
| 2016/0054427 A1 | 2/2016 | Wirola et al. |
| 2016/0066154 A1 | 3/2016 | Shin |
| 2016/0094947 A1 | 3/2016 | Shen et al. |
| 2016/0192136 A1 | 6/2016 | Pan et al. |
| 2016/0260059 A1 | 9/2016 | Benjamin et al. |
| 2016/0374046 A1 | 12/2016 | Wirola et al. |
| 2017/0026806 A1* | 1/2017 | Jampani .................. G01S 5/02 |
| 2017/0068902 A1 | 3/2017 | Kirshner |
| 2017/0078851 A1 | 3/2017 | Agrawal et al. |
| 2017/0103489 A1 | 4/2017 | Asad et al. |
| 2017/0142684 A1* | 5/2017 | Bhatt .................. H04B 17/318 |
| 2017/0160375 A1 | 6/2017 | Syrjarinne et al. |
| 2017/0177620 A1* | 6/2017 | Zhang .................. G06F 16/29 |
| 2017/0238146 A1 | 8/2017 | Kulig et al. |
| 2017/0311165 A1 | 10/2017 | Kang et al. |
| 2017/0325070 A1 | 11/2017 | Wirola et al. |
| 2017/0343639 A1 | 11/2017 | Ivanov et al. |
| 2017/0343640 A1 | 11/2017 | Khan et al. |
| 2018/0007067 A1 | 1/2018 | Kaushik |
| 2018/0067187 A1 | 3/2018 | Oh et al. |
| 2018/0070239 A1 | 3/2018 | Norrman et al. |
| 2018/0113189 A1 | 4/2018 | Khan et al. |
| 2018/0123708 A1 | 5/2018 | Khalajmehrabadi et al. |
| 2018/0188348 A1 | 7/2018 | Wirola et al. |
| 2018/0219869 A1 | 8/2018 | Kumar et al. |
| 2018/0255430 A1 | 9/2018 | Ivanov et al. |
| 2018/0279067 A1 | 9/2018 | Ivanov et al. |
| 2018/0332558 A1* | 11/2018 | Chan .................... H04W 24/02 |
| 2018/0352585 A1 | 12/2018 | Yang et al. |
| 2019/0036951 A1 | 1/2019 | Kim |
| 2019/0150001 A1 | 5/2019 | Jen et al. |
| 2019/0174452 A1 | 6/2019 | Lev et al. |
| 2019/0340363 A1 | 11/2019 | Walrant |
| 2020/0015096 A1 | 1/2020 | Wirola et al. |
| 2020/0036590 A1 | 1/2020 | Camarillo Gonzalez et al. |
| 2020/0112570 A1 | 4/2020 | Yang et al. |
| 2002/0204988 | 6/2020 | Wirola et al. |
| 2020/0200856 A1 | 6/2020 | Wirola et al. |
| 2020/0200857 A1 | 6/2020 | Wirola et al. |
| 2020/0200858 A1 | 6/2020 | Wirola et al. |
| 2020/0200859 A1 | 6/2020 | Wirola et al. |
| 2020/0200864 A1 | 6/2020 | Wirola et al. |
| 2020/0200865 A1 | 6/2020 | Wirola et al. |
| 2020/0205005 A1 | 6/2020 | Wirola et al. |

FOREIGN PATENT DOCUMENTS

| | | |
|---|---|---|
| EP | 3 076 582 A1 | 10/2016 |
| EP | 3 410 156 A1 | 12/2018 |
| WO | WO 2015/189161 A1 | 12/2015 |
| WO | WO 2017/100686 A1 | 6/2017 |

OTHER PUBLICATIONS

Notice of Allowance for U.S. Appl. No. 16/723,802 dated Nov. 6, 2020.

Non-Final Office Action for U.S. Appl. No. 16/723,451 dated Nov. 23, 2020.

Extended European Search Report for Application No. EP 18 21 4716 dated Jul. 5, 2019, 6 pages.

Extended European Search Report for Application No. EP 18 21 4721 dated Jul. 22, 2019, 7 pages.

Extended European Search Report for Application No. EP 18 21 4705 dated Jul. 5, 2019, 8 pages.

Extended European Search Report for Application No. EP 18 21 4688 dated Jul. 9, 2019, 6 pages.

Extended European Search Report for Application No. EP 18 21 4718 dated Jun. 17, 2019, 9 pages.

Extended European Search Report for Application No. EP 18 21 4720 dated Jul. 15, 2019, 8 pages.

Extended European Search Report for Application No. EP 18 21 4694 dated Jul. 5, 2019, 6 pages.

Extended European Search Report for Application No. EP 18 21 4724 dated Jul. 12, 2019, 9 pages.

U.S. Appl. No. 16/721,311, filed Dec. 19, 2019; In re: Witola et al. entitled *Enabling Flexible Provision of Signature Data of Position Data Representing an Estimated Position.*

U.S. Appl. No. 16/723,451, filed Dec. 20, 2019; In re: Wirola et al. entitled *Service for Real-Time Spoofing/Jamming/Meaconing Warning.*

U.S. Appl. No. 16/723,572, filed Dec. 20, 2019; In re: Wirola et al. entitled *Statistical Analysis of Mismatches for Spoofing Detection.*

U.S. Appl. No. 16/723,662, filed Dec. 20, 2019; In re: Wirola et al. entitled *Device-Centric Learning of Manipulated Positioning.*

U.S. Appl. No. 16/723,721, filed Dec. 20, 2019; In re: Wirola et al. entitled *Identifying Potentially Manipulated Radio signals and/or Radio Signal Parameters Based on a First Radio Map Information and a Second Radio Map Information.*

(56) References Cited

OTHER PUBLICATIONS

U.S. Appl. No. 16/723,768, filed Dec. 20, 2019; In re: Wirola et al. entitled *Identifying Potentially Manipulated Radio Signals and/or Radio Signal Parameters Based on Radio Map Information*.
U.S. Appl. No. 16/723,802, filed Dec. 20, 2019; In re: Wirola et al. entitled *Identifying Potentially Manipulated Radio Signals and/or Radio Signal Parameters*.
GPS Spoofing a Growing Problem for Uber [online] [retrieved Feb. 17, 2020]. Retrieved via the Internet: https:/soliddriver.com/GPS-Spoofing-A-Growing-Problem-for-Uber (dated Nov. 10, 2019) 4 pages.
Galileo Commercial Service Implementing Decision enters into force Uber [online] [retrieved Feb. 17, 2020]. Retrieved via the Internet: https://www.gsa.europa.eu/newsroom/news/galileo-commercial-service-implementing-decision-enters-force (dated Feb. 10, 2017) 6 pages.
Mutual authentication—Wikipedia [online] [retrieved Feb. 17, 2020]. Retrieved via the Internet: https://web.archive.org/web/20180819072045/https://en.wikipedia.org/wiki/Mutual_authentication (dated Aug. 19, 2018) 2 pages.
Android keystore system | Android Developers [online] [retrieved Feb. 17, 2020]. Retrieved via the Internet: https://web.archive.org/web/20181212204557/https://developer.android.com/training/articles/keystore (dated Dec. 12, 2018) 17 pages.
Subscriber Identity Module—Wikipedia [online] [retrieved Feb. 17, 2020]. Retrieved via the Internet: https://web.archive.org/web/2017092316223/https://fi.wikipedia.org/wiki/Subscriber_Identity_Module (dated Sep. 23, 2017) 2 pages.
Extensible Authentication Protocol—Wikipedia [online] [retrieved Feb. 17, 2020]. Retrieved via the Internet: https://web.archive.org/web/20171209152957/https://en.wikipedia.org/wiki/Extensible_Authentication_Protocol (dated Dec. 9, 2017) 10 pages.
Arkko, J. et al., *Extensible Authentication Protocol Method for 3rd Generation Authentication and Key Agreement (EAP-AKA)*, RFC4187 (Jan. 2006) 80 pages.
Tang, Z. et al., *Exploiting Wireless Received Signal Strength Indicators to Detect Evil-Twin Attacks in Smart Homes*, Hindawi, Mobile Information systems, vol. 2017, Article ID 1248578 (Jan. 2017) 14 pages.
Enterprise Mobility 8.1 Design Guide—WLAN RF Design Consideration [Cisco 5500 Series Wireless Controllers]—Cisco [online] [retrieved Feb. 25, 2020]. Retrieved via the Internet: https://web.archive.org/web/20170801042321/https://www.cisco.com/c/en/us/td/docs/wireless/controller/8-1/Enterprise-Mobility-8-1-Design-Guide/Enterprise_Mobility_8-1_Deployment_Guide/wlanrf.html (dated Aug. 1, 2017) 46 pages.
Office Action for European Application No. 18214716.5 dated Feb. 5, 2021, 5 pages.
Office Action for U.S. Appl. No. 16/723,662 dated Jul. 9, 2020.
Office Action for U.S. Appl. No. 16/723,572 dated Jul. 7, 2020.
Office Action for U.S. Appl. No. 16/723,721 dated Jul. 1, 2020.
Extended European Search Report for Application No. EP 18214714.0 dated Jul. 5, 2019, 6 pages.
Office Action for U.S. Appl. No. 16/723,802 dated May 18, 2020.
Final Office Action for U.S. Appl. No. 16/723,663 dated Dec. 18, 2020.
Final Office Action for U.S. Appl. No. 16/723,572 dated Dec. 8, 2020.
Final Office Action for U.S. Appl. No. 16/723,802 dated Sep. 2, 2020, 18 pages.
Non-Final Office Action for U.S. Appl. No. 16/723,662 dated May 7, 2021.
Final Office Action for U.S. Appl. No. 16/723,451 dated May 3, 2021.
Office Action for European Application No. 18214718.1 dated Jul. 14, 2021, 9 pages.
Office Action for European Application No. 18214724.9 dated Jun. 30, 2021, 8 pages.
Advisory Action for U.S. Appl. No. 16/723,662 dated Mar. 22, 2021.
Non-Final Office Action for U.S. Appl. No. 16/723,572 dated Mar. 22, 2021.
Non-Final Office Action for U.S. Appl. No. 16/723,768 dated Jun. 9, 2021.
Wirola et al., "Bandwidth and Storage Reduction of Radio Maps for Offline WLAN Positioning", 2013 International Conference on Indoor Positioning and Indoor Navigation, (Oct. 28-31, 2013), 9 pages.
Notice of Allowance for U.S. Appl. No. 16/723,572 dated Jul. 13, 2021.
Advisory Action for U.S. Appl. No. 16/723,451 dated Jul. 15, 2021.
Non-Final Office Action for U.S. Appl. No. 16/723,451 dated Sep. 7, 2021.
Office Action for European Application No. 18214688.6 dated Aug. 25, 2021, 4 pages.
Office Action for European Application No. 18214694.4 dated Aug. 27, 2021, 4 pages.
Final Office Action for U.S. Appl. No. 16/723,662 dated Oct. 15, 2021.
Advisory Action for U.S. Appl. No. 16/723,662 dated Jan. 7, 2022.
Final Office Action for U.S. Appl. No. 16/723,451 dated Jan. 24, 2022.
Final Office Action for U.S. Appl. No. 16/723,768 dated Nov. 1, 2021.
Notice of Allowance for U.S. Appl. No. 16/723,768 dated Nov. 22, 2021.
Non-Final Office Action for U.S. Appl. No. 16/721,311 dated Feb. 16, 2022.
Notice of Allowance for U.S. Appl. No. 16/723,662 dated Apr. 1, 2022.
Advisory Action for U.S. Appl. No. 16/723,451 dated Apr. 7, 2022.

\* cited by examiner

CROWD-SOURCING OF POTENTIALLY MANIPULATED RADIO SIGNALS AND/OR RADIO SIGNAL PARAMETERS

CROSS-REFERENCE TO RELATED APPLICATIONS

This application claims priority to European Application No. 18214718.1, filed Dec. 20, 2018, the entire contents of which are incorporated herein by reference.

FIELD

The invention relates to the field of non-GNSS based radio positioning and more specifically to identifying potentially manipulated radio signals and/or radio signal parameters.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS) or the Galileo system, do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated non-GNSS based radio positioning systems for indoor and outdoor positioning have been developed and commercially deployed during the past years. Examples comprise systems that are based on pseudolites, which are ground based GPS-like short-range beacons, ultra-sound positioning systems, Bluetooth low energy (BLE) based positioning systems, cellular network based positioning systems and wireless local area network (WLAN) based positioning systems. WLAN based positioning systems typically use the WLAN infrastructure "as is", i.e. they do not typically require installation of additional access points or reconfiguration of the existing network unless the geometry of the access points is exceptionally unfavorable for the positioning purposes.

Such a non-GNSS based radio positioning system (e.g. a self-contained positioning system) may be divided in at least three stages, an installation stage, a training stage and a positioning stage.

In the installation stage, dedicated positioning support radio devices (e.g. Bluetooth beacons) may be installed in the environment for which a positioning system is to be provided. Alternatively or additionally, a non-GNSS based radio positioning system may make use of existing radio devices like WLAN access points or cellular network nodes as positioning support radio devices.

In the subsequent training stage, positioning data are collected. The data may be collected in the form of radio fingerprint observation reports that are based on measurements by mobile devices. A radio fingerprint observation report may indicate an observation position and radio signal parameters obtained as a result of measurements taken from the radio interface when scanning for observable radio signals at the observation position. The observation position may be for example GNSS based, sensor-based, or manually inputted. Measurements taken from the radio interface may comprise, by way of example, measured received signal strengths and identifiers of radio devices (e.g. Bluetooth beacons, WLAN access points, base stations of a cellular network) transmitting the radio signals observable at the observation position. The training may be a continuous background process, in which mobile devices of a large number of consumers are continuously reporting collected fingerprint observation reports to a server. Consumers may consent to a participation in such a radio fingerprint observation report collection, if their device is equipped with the needed functionality. This approach is also referred to as crowd-sourcing. Since crowd-sourcing is a background process that does not directly benefit the device user, it is desirable that the crowd-sourcing process only consumes limited resources of the device.

Alternatively or additionally, mobile devices may be used for collecting radio fingerprint observation reports in a systematic manner. Collected reports may be uploaded to a database in a positioning server or in a positioning cloud, where algorithms may be run to generate radio models of positioning support devices (e.g. Bluetooth beacons, WLAN access points, base stations of a cellular network) and/or radio maps for positioning purposes.

In the positioning stage, a mobile device may estimate its current position based on own measurements taken from the radio interface and on information or a subset of information that is available from the training stage. Radio model information or radio map information that has been generated in the training stage may be provided to mobile devices by a positioning server via the Internet as assistance information for use in position estimation. Alternatively, radio model information and/or radio map information may be stored in a positioning server to which the mobile devices may connect to via the Internet for obtaining a position estimate.

SUMMARY OF SOME EXEMPLARY EMBODIMENTS

Non GNSS-based radio positioning systems (e.g. Bluetooth, WLAN and cellular based radio positioning systems) as disclosed above may be affected by manipulating radio signals that are used for positioning purposes during the positioning stage.

Manipulation techniques may for example be spoofing or jamming of such radio signals:
  Spoofing of radio signals may be considered to relate to a deliberate attempt to deceive a mobile device by falsifying radio signals structured to resemble one or more authentic radio signals. This may for example be done by transmitting (e.g. broadcasting) one or more manipulated (e.g. falsified) radio signals or by retransmitting (e.g. rebroadcasting) authentic signals captured at a different position and/or time. Alternatively, a spoofing malware running on the mobile device may falsify scanning results (e.g. detected radio signal parameters) when the mobile device scans for observable radio signals for estimating its position. Such falsified (i.e. "spoofed") radio signals or scanning results may be used to cause the mobile device to determine its position to be somewhere other than where it actually is.
  Jamming of radio signals may be considered to relate a deliberate attempt to disrupt detecting one or more radio signals by a mobile device, for example by transmitting radio signals and/or radio noise interfering the one or more radio signals.

Jamming of radio signals may also occur unintentionally by signals from near-by radios sources, which may for instance mix in a receiver's radio frequency front-end into in-band interference.

Such manipulation techniques are a threat to business models which rely on trustworthy positioning like car sharing services. It is inter-alia an object of the present invention to improve the above disclosed non-GNSS based radio positioning systems to enable mitigating the threat associated with such manipulation techniques.

Spoofing detection in a device to be positioned may be a statistical process. Because of this, spoofing is not 100% reliable resulting in both false positive and false negative detections. Thus, it is possible that a mobile device might not re-detect the same spoofing attempt when visiting the same area or when observing the same set of spoofed access points again.

Therefore, e.g. reports of spoofing, jamming, and/or meaconing attempts are known to be stored locally at the device, e.g. in a local database. Based on the stored reports in the database, e.g. further spoofing attempts are easier to detect. However, even these devices could benefit from external help.

There is a wide base of devices without multiple radios and/or frequency bands at their disposal making spoofing detection practically impossible in these devices. Thus, this class of devices may profit from external help to provide reliable location information under all circumstances.

According to a first exemplary aspect of the present invention, a method is disclosed, the method comprising:

obtaining one or more pieces of spoofing information indicative of a data set enabling positioning based on radio signals sent by a respective radio node, and wherein the data set is further indicative of one or more parameters based on which said positioning is performed and/or controlled and which is considered to be at least partially unexpected;

aggregating spoofing information based on the one or more parameters of the respective data set of the one or more pieces of spoofing information; and providing at least a part of the aggregated spoofing information for usage in a positioning.

This method may for instance be performed and/or controlled by an apparatus, for instance a server. Alternatively, this method may be performed and/or controlled by more than one apparatus, for instance a server cloud comprising at least two servers.

According to a further exemplary aspect of the invention, a computer program is disclosed, the computer program when executed by a processor causing an apparatus, for instance a server, to perform and/or control the actions of the method according to the first exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the first exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a second exemplary aspect of the present invention, a method is disclosed, the method comprising:

gathering one or more radio measurements indicative of one or more pieces of identifying information of one or more radio nodes that are observable at a certain position, wherein the one or more radio measurements are gathered based on radio signals sent by the one or more radio nodes enabling positioning; and outputting spoofing information formed based on the one or more radio measurements.

This method may for instance be performed and/or controlled by an apparatus, for instance a mobile device, e.g. a mobile terminal. For instance, the method may be performed and/or controlled by using at least one processor of the mobile device.

According to a further exemplary aspect of the invention, a computer program is disclosed, the computer program when executed by a processor causing an apparatus, for instance a server, to perform and/or control the actions of the method according to the second exemplary aspect.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory, for instance a Read-Only Memory (ROM) or hard disk of a computer, or be intended for distribution of the program, like an optical disc.

According to a further exemplary aspect of the invention, an apparatus is disclosed, configured to perform and/or control or comprising respective means for performing and/or controlling the method according to the second exemplary aspect.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus, for instance the apparatus, at least to perform and/or to control the method according to the second exemplary aspect.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components, for instance means, processor, memory, or may further comprise one or more additional components.

According to a third exemplary aspect of the invention, a system is disclosed, comprising:
  a first apparatus according to the first exemplary aspect of the present invention as disclosed above, configured to perform and/or control the method of the first exemplary aspect of the present invention, and a second apparatus according to the second exemplary aspect of the present invention as disclosed above, configured to perform and/or control the method of the second exemplary aspect of the present invention.

The first apparatus and the second apparatus are in particular configured to perform the respective methods according to the first and the second exemplary aspect of the present invention together.

In the following, exemplary features and exemplary embodiments of all aspects of the present invention will be described in further detail.

The one or more pieces of spoofing information may for instance be obtained by receiving the one or more pieces of spoofing information. The one or more pieces of spoofing information may for instance be obtained (e.g. received) from one or more mobile devices (e.g. an IoT (Internet-of-Things) device, a smart home device, a smartphone, a tablet computer, a notebook computer, a smart watch, a smart band, to name but a few non-limiting examples) or from a server or a server cloud that is different from the apparatus performing and/or controlling the method according to the first exemplary aspect of the present invention.

The data set enables positioning based on radio signals sent by a respective radio node. Further, the data set is indicative of one or more parameters based on which said positioning is performed and/or controlled and which is considered to be at least partially unexpected.

The obtained one or more pieces of spoofing information are aggregated, e.g. into a memory comprising a database. The one or more pieces of spoofing information are aggregated based on the one or more parameters of the respective data set of the one or more pieces of spoofing information. Additionally or alternatively to obtaining one or more pieces of spoofing information, e.g. fresh database records may for instance be obtained (e.g. received), so that they can be aggregated as well. Further, rawer data sets may be obtained. At the extreme, those rawer data sets may comprise or represent raw radio measurements (e.g. identities, signal strengths, other measurements of one or more radio nodes) that a respective mobile device has e.g. gathered, and, optionally, determined to be suspicious (e.g. positioning performed and/or controlled based on the respective radio signals and/or radio signal parameters are considered to be at least partially unexpected). Alternatively, the aggregation comprises determining whether or not the obtained rawer data sets is suspicious.

Aggregating the obtained one or more pieces of spoofing information, and optionally, one or more rawer data sets may for instance comprise aggregating information respectively data from multiple sources. In this way, it is enabled to keep spoofing/jamming/meaconing data up-to-date (e.g. fresh). Further, it is enabled to distribute the aggregated information respectively data (e.g. in the form of one or more pieces of aggregated spoofing information) back to one or more mobile devices, e.g. configured as clients, and/or e.g. to one or more components responsible for cloud-based positioning in one or more location-based services, to name but a few non-limiting examples.

The one or more pieces of aggregated spoofing information may for instance be arranged to a geospatial index. This may for instance be considered to be a simple manner. Such a database may for instance be a (e.g. simple) geospatial database. When maintaining (e.g. comprising a storing or an updating an existing database) with data for the radio nodes and/or the one or more (e.g. geographical) areas, for instance, the Earth surface may for instance be divided into a multi-scale grid (geospatial index) that allows associating data structures with each of the respective geographical areas. Further, such data may be associated with each of the respective geographical areas and/or with at least one of the one or more radio nodes stored in the database at varying spatial resolution. In this way, the storage needed by the database may for instance be optimized.

For instance, aggregating (e.g. adding) one or more (e.g. new) pieces of spoofing information, and/or other information and/or data currently not comprised by the database into such a database may be performed and/or controlled straightforward, e.g. directly as the respective information and/or data comes in. The information respectively data contents, in particular comprised by or represented by the one or more pieces of spoofing information, may be one or more of the following:
  one or more radio types (e.g. WiFi, Bluetooth, Cellular, etc.) under influence;
  one or more radio bands (e.g. 2.4 GHz WiFi, 5 GHz WiFi, etc.) under influence;
  one or more types of influence (e.g. spoofing/jamming/meaconing);
  one or more identities of one or more radio nodes under influence;
  whether a determined influence detection is considered to be reliable/uncertain (e.g. including a probability or probability index); and
  if a determined influence is considered to be continuous/sporadic/periodic.

A server or server cloud aggregating the one or more pieces of spoofing information, and optionally, other information respectively data contents may for instance take care of amending stored one or more pieces of aggregated spoofing information. Further, the aggregating may for instance comprise cleaning stored one or more pieces of aggregated spoofing information up, and/or removing no longer valid or too old stored one or more pieces of aggregated spoofing information. For example, if there are no (e.g. further) spoofing, jamming, and/or meaconing reports for a given area in a defined time period, the spoofing information for that area may be cleared. A possible implementation may for instance be that one or more mobile devices (e.g. respectively performing and/or controlling the method according to the second exemplary aspect of the present invention) send (e.g. report), in addition to detected spoofing attempts, one or more pieces of spoofing information comprising or representing no-detection data so that e.g. the server performing and/or controlling the method according to the first exemplary aspect of the present invention may for instance also obtain one or more pieces of spoofing information being indicative of clean areas, e.g. one or more identifiers of radio nodes that are considered to not be manipulated and which are located within such a clean area.

At least a part of the aggregated spoofing information is provided (e.g. distributing) for usage in a positioning. Such a part of the aggregated spoofing information may for instance be subsets of the aggregated spoofing information, e.g. stored in the database.

Such subsets of the database may for instance be provided (e.g. transferred) to one or more mobile device(s), e.g. mobile devices performing and/or controlling the method according to the second exemplary aspect of the present invention. Obviously, a single mobile device may for instance not require a full (e.g. global) database comprising aggregated spoofing information. Thus, when a respective mobile device may for instance retrieve (e.g. request) the respective database comprising aggregated spoofing information, e.g. from the server or a server cloud performing and/or controlling the method according to the first exemplary aspect of the present invention, the respective mobile device may for instance provide e.g. an indication of its location (e.g. a position estimate) prior to the retrieving. In this way, e.g. the server or server cloud performing and/or controlling the method according to the first exemplary aspect of the present invention may for instance return relevant data for the surroundings of the respective mobile device (e.g. an area in which the respective mobile device is located), only. Further, this enables to keep the data amounts to be transferred from the server or the server cloud to the respective mobile device low. Moreover, in such a request the respective mobile device(s) may for instance also state information comprising or representing one or more radio capabilities of the respective mobile device, so that subsets of aggregated spoofing information may for instance only be provided to the respective mobile device(s) for the relevant radios.

At least a part of the aggregated spoofing information (e.g. a subset, as disclosed above) may for instance be provided by outputting the part of the aggregated spoofing information, e.g. to the entity from which the obtained request stems, or to another entity that is different from the entity from which a respective spoofing information of the obtained one or more pieces of spoofing information stems, and which transmits (e.g. relays) at least the output part of the aggregated spoofing information to the entity from which the respective spoofing information of the obtained one or more pieces of spoofing information stems. At least the part of the aggregated spoofing information may for instance be output via a communication interface of the apparatus (e.g. server or server cloud) performing and/or controlling the method according to the first exemplary aspect of the present invention. Such a communication interface may for instance comprise one or more radio transceivers (e.g. transmitter and receiver), e.g. according to WLAN-, BT-, BLE-, cellular-communication standard, or a combination thereof, to name but a few non-limiting examples.

As disclosed above, the aggregated spoofing information may for instance be stored in a database. Such a database may for instance be maintained in a memory. Such a memory may for instance be comprised by or be connectable to the at least one apparatus performing and/or controlling the method according to the first exemplary aspect of the present invention. The maintaining of such a database may for instance be referred to as keeping the database. The database, or at least a part of the aggregated spoofing information stored in the database, may for instance be available upon a certain request so that e.g. information of the database can be retrieved to be further utilized, e.g. for determining a position estimate at least partially based on at least the part of the retrieved aggregated spoofing information. It will be understood that retrieving at least a part of the aggregated spoofing information may for instance be performed and/or controlled by the apparatus (e.g. a mobile device) performing and/or controlling the method according to the second exemplary aspect, while the retrieving requires a providing of at least a part of the aggregated spoofing information, which may for instance be performed and/or controlled by an apparatus (e.g. the server or the server cloud) performing and/or controlling the method according to the first exemplary aspect of the present invention.

According to an exemplary embodiment of all aspects of the present invention, said positioning is considered to be at least partially unexpected if the positioning is considered to be potentially manipulated, in particular that a position estimated by said positioning is considered to be unexpected.

If spoofing, jamming or meaconing occurs, one or more radio signals and/or one or more radio signal parameters may behave in an unexpected way and, thus, radio signal parameters may be determined to be unexpected for a position of a respective mobile device. For example, if a malware running on a respective mobile device falsifies the scanning results, a representation of a certain physical quantity of the one or more radio signals may not change when the mobile device moves from a first position to a second position. Accordingly, if it is determined that the radio signal parameters of the second position are unexpected for the second position of the mobile device, the one or more radio signals and/or the radio signal parameters of the first position and the radio signal parameters of the second position may be considered to be potentially manipulated. Such information as aforementioned may for instance be comprised by the data set of a respective spoofing information. Thus, a respective spoofing information may for instance allow identifying potentially manipulated radio signals and/or radio signal parameters and/or radio nodes transmitting potentially manipulated radio signals and/or radio signal parameters and, thus, to mitigate threats associated with manipulation techniques like spoofing, jamming, and/or meaconing.

According to an exemplary embodiment of the first exemplary aspect of the present invention, the method further comprises:
  storing or updating (e.g. removing outdated entries) the one or more pieces of aggregated spoofing information for usage in a positioning.
Storing or updating may for instance be performed and/or controlled based on a timestamp information that is associated with a respective aggregated spoofing information of the one or more pieces of aggregated spoofing information enabling to keep the stored records of the at least one mobile device up-to-date. For instance, an actual time and/or date may for instance be compared to a respective timestamp information. Based on such a comparison, e.g. outdated aggregated spoofing information may for instance be determinable. Then, the respective determined and outdated aggregated spoofing information may for instance be updated, or removed, e.g. to maintain the aggregated spoofing information up-to-date.

After aggregating the obtained one or more pieces of spoofing information, the aggregated spoofing information may for instance be stored. For instance, the aggregated spoofing information may for instance be stored in case currently there are no aggregated spoofing information stored, e.g. in the memory. For instance, in case an initial aggregating of one or more pieces of spoofing information is performed and/or controlled, the aggregated spoofing information may for instance be stored. Then, in case further spoofing information are obtained, e.g. the already stored aggregated spoofing information may for instance be updated at least partially based on the further spoofing information, which may for instance be aggregated into the stored aggregated spoofing information, to name but one non-limiting example.

According to an exemplary embodiment of the first exemplary aspect of the present invention, the aggregated spoofing information are stored in a database.

According to an exemplary embodiment of all aspects of the present invention, the one or more parameters of a respective data set of the one or more pieces of spoofing information comprises or represents one or more of the following parameters i) to v):
  i) radio-type information indicative of at least one radio type that is considered to be potentially manipulated;
  ii) frequency-band information indicative of at least one frequency-band that is considered to be potentially manipulated;
  iii) identifier of at least one radio node enabling positioning that is considered to be potentially manipulated;
  iv) influencing information indicative of a certain type of influence that is considered to be potentially manipulated and/or if certain type of influence is continuous or sporadic or periodic; and
  v) detection information indicative of whether or not detection of manipulation is reliable or uncertain (e.g. indicated by a probability of the detection or by a probability index).

In the database storing the aggregated spoofing information, a respective radio node may for instance be comprised or represented by the data set of a respective spoofing information. The data set is further indicative of one or more parameters based on which said positioning is performed and/or controlled and which is considered to be at least partially unexpected. For instance, such a respective radio node comprised or represented by the aggregated spoofing information may further be associated with (e.g. linked to) a radio-type information. Such a radio-type information may for instance be indicative of that a specific type of radio (e.g. WiFi, Bluetooth, cellular, or a combination thereof) is under influence.

In the database, a respective radio node of the one or more radio nodes and/or a respective area of one or more areas (and e.g. comprising at least one affected radio node) as comprised by or represented by the aggregated spoofing information may further be associated with (e.g. linked to) a radio-type information. Such a radio-type information may for instance be indicative of that a specific type of radio (e.g. WiFi, Bluetooth, cellular, or a combination thereof) is under influence.

For instance, in the database, a respective identifier of a certain radio node may for instance be associated with (e.g. linked to) one or more further pieces of information, e.g. wherein such an information may for instance be a radio-type information.

Furthermore, such a radio-type information associated with the respective radio node of one or more radio nodes and/or associated with at least one area of one or more areas as comprised or represented by the aggregated spoofing information may be used to filter (e.g. all of) the other radio node(s) and/or area(s) comprised in the database. For instance, in case a certain radio node is affected—thus considered to be potentially manipulated—at least partially based on the associated radio-type information, it may for instance be enabled to identify (e.g. all of) the other radio node(s) using the same radio-type, so that e.g. those further identified radio nodes may be provided as a part of the aggregated spoofing information, e.g. to a respective mobile device.

According to an exemplary embodiment of all aspects of the present invention, the radio-type information is indicative of one of the following types:
  i) a cellular-based type;
  ii) a WiFi-based type; or
  iii) a Bluetooth-, in particular Bluetooth Low Energy-based type.

Thus, at least partially on the radio-type information, at least one of the following radio signals may for instance be identified to be potentially manipulated:
  a Bluetooth radio signal (e.g. a Bluetooth Low Energy (BLE) radio signal);
  a WLAN radio signal; and
  a cellular radio signal.

Accordingly, one or more respective radio nodes of the database may for instance be at least one of the following types of radio nodes:
  a Bluetooth beacon (e.g. a Bluetooth beacon enabling Bluetooth low energy mode or a Bluetooth low energy beacon);
  an access point of a WLAN; and
  a cellular network node.

The Bluetooth beacons may comprise a Bluetooth and/or BLE radio interface, which includes at least a Bluetooth and/or BLE transmitter. The Bluetooth and/or BLE transmitter may also be a part of a Bluetooth and/or BLE transceiver of a respective (communication) interface. The Bluetooth and/or BLE radio interface may be configured to transmit Bluetooth and or BLE radio signals. A Bluetooth beacon that is employed for the invention may be any kind of Bluetooth beacon complying with any present or future standard.

Such Bluetooth beacons may be easily installed as dedicated position support radio nodes at various installation positions and require little to no maintenance. For example, a plurality of Bluetooth beacons may be easily distributed across a certain area and may cover a certain area (e.g. the area of the environment represented by the radio map and/or of the above disclosed system) with Bluetooth radio signals transmitted (e.g. broadcasted) by the Bluetooth beacons. Also, Bluetooth technologies are supported by many mobile devices by default such as most smartphones, most tablet computers, most notebook computers, most smart watches and most smart bands, etc. Using Bluetooth beacons and/or BLE beacons may thus have the effect that many mobile devices may use such non-GNSS based radio positioning system without any adaptation of hardware. As a result, the approach may be globally scalable and have low maintenance and deployment costs. In addition, regarding positioning utilizing received signal strength the end-user experience may be acceptable with these technologies, since a horizontal positioning accuracy of e.g. 2 to 3 meters as well as a high reliability in floor detection may be achieved. The Bluetooth beacons may be stand-alone devices or be integrated into or attached to some other device. Bluetooth beacons, in particular in low energy mode (BLE), require comparably little energy and the use of Bluetooth low energy may enable a positioning with limited energy consumption at all involved devices.

It is to be understood, however, that other types of radio nodes than variations of Bluetooth beacons may be used as well as dedicated position support radio nodes, for instance tag devices or other devices that are configured to transmit ultra-wideband (UWB) signals or any wireless radio signals that might emerge in the future.

As disclosed above, existing radio nodes like WLAN access points or cellular network nodes may be used as positioning support radio nodes alternatively or additionally.

A WLAN access point may comprise a WLAN radio interface, which for example includes a WLAN transceiver. The WLAN radio interface may be configured to transmit and/or receive WLAN radio signals. Accordingly, the radio signal transmitted by such an access point and/or router of a WLAN may be a WLAN radio signal. WLAN is for example specified by the standards of the IEEE 802.11 family (http://www.ieee.org/).

A cellular network node may be a base transceiver station (BTS) or a node-B of a cellular network like a 2G/3G/4G/5G cellular communication network. A cellular network node may comprise a cellular radio interface, which for example includes a 2G/3G/4G/5G transceiver. Accordingly, the radio signal transmitted by such cellular network node may be a 2G/3G/4G/5G cellular radio signal.

Furthermore, such a radio-type information associated with at least one radio node of the one or more radio nodes and/or with at least one area of the one or more areas may be used to filter (e.g. all of) the other radio node(s) and/or area(s) comprised in the database storing the aggregated spoofing information.

According to an exemplary embodiment of all aspects of the present invention, the database further comprises an influence information associated with one or more radio nodes and/or the one or more areas, wherein the influence information represents that the positioning enabled by the respective radio node and/or within the respective area is considered to be potentially manipulated, in particular so that e.g. those radio nodes and/or areas comprising those radio nodes of the influence information may be provided as a part of the aggregated spoofing information, e.g. to a respective mobile device.

Such an influence information may for instance be associated with (e.g. linked to) a certain radio node and/or to a certain area that are maintained (e.g. kept, or stored) in the database.

For instance, in the database, a respective identifier of a certain radio node may for instance be associated with (e.g. linked to) one or more further pieces of information, e.g. wherein such an information may for instance be an influence information.

According to an exemplary embodiment of all aspects of the present invention, each respective radio node of the one or more radio nodes and/or of the one or more areas is associated with a respective identifier enabling identification of the respective radio node.

A respective identifier may for instance be a radio signal parameter of a certain radio signal contained or comprised in the radio signal. A respective identifier may for instance be a representation (e.g. an indicator or a value) of a physical quantity (e.g. a received signal strength) of the radio signal. Accordingly, a respective identifier may be determined by at least one of (1) extracting information contained or comprised in the radio signal and (2) measuring a physical quantity (e.g. a received signal strength) of the radio signal. A respective identifier may for instance be a SSID (Service Set Identifier) of a respective radio node configured as a WLAN access point. A respective identifier may for instance be a UUID (Universally Unique Identifier) of a respective radio node configured as a Bluetooth, and/or Bluetooth Low Energy beacon. A respective identifier may for instance be a MAC (Medium Access Control) Address, or another device address of the respective radio node.

According to an exemplary embodiment of all aspects of the present invention, the data set further comprises a position information indicative of the at least one radio node enabling positioning that is considered to be potentially unexpected, or wherein such a position information is determined based on the identifier of at least one radio node enabling positioning that is considered to be potentially manipulated.

Further, the respective identifier may for instance be used to determine the location of at least one radio node, and/or of the respective area in which the respective radio node is located. The database may for instance comprise an association or a link to retrieve the location of the respective radio node and/or of the respective area based at least partially on the respective identifier of the respective radio node.

In this way, it is enabled to determine one or more locations of one or more (e.g. affected) radio nodes and/or the respective one or more areas in which one or more (e.g. affected) radio nodes are located based at least partially on such one or more respective identifiers, e.g. that are comprised or represented by the aggregated spoofing information.

According to an exemplary embodiment of the first exemplary aspect of the present invention, the one or more pieces of spoofing information are aggregated into a geospatial index, wherein the geospatial index comprises a plurality (e.g. at least two) of areas (or parts of the areas) associated with a geographic space, wherein the data sets of the one or more pieces of spoofing information are mapped to a respective area of the plurality of areas.

Furthermore, such a geospatial database may for instance be enriched with other information, e.g. venue information (or with even more detailed information specifying a floor/section in the venue) to pinpoint the area/radio under influence more precisely.

Additionally or alternatively, once spoofing/jamming/meaconing has been detected, keeping the database comprising aggregated spoofing information of those attempts obtained from a plurality of devices can e.g. be achieved by means of a another type of a database, which may for instance be a global database of radio node identities that are under influence. This data may not be tied to any specific location.

In such aforementioned types of databases, when a respective mobile device again enters e.g. the area of influence, the respective mobile device may take at least one of the following actions:

- The sensitivity of spoofing, jamming, and/or meaconing detection can be increased. This will increase the probability of detecting a such attempts. This will also increase the rate of false positives, but this can be considered to be acceptable under risky conditions.
- Block affected radio transmitters, radio types and radio bands from positioning.
- Trust more on non-spoofable methods such as inertial and magnetic sensors Also, based on the global database comprising the aggregated spoofing information (e.g. identities of affected radio nodes), the respective mobile device(s) may for instance block those affected radio nodes from positioning regardless of their respective (e.g. current) location.

In this way, maintaining (e.g. keeping) the database comprising the aggregated spoofing information, in particular indicative of one or more influenced areas, and/or one or more radio nodes, and/or one or more radio transmitters may for instance be another line-of-defense against spoofing, jamming, meaconing, or a combination thereof. Keeping at least a part of such a database internally in a respective memory comprised by a respective mobile device (e.g. performing and/or controlling the method according to the second exemplary aspect of the present invention) may for instance be especially useful for (a) respective mobile device(s) with limited connectivity, such as small CPU/memory/battery IoT devices.

According to an exemplary embodiment of the first exemplary aspect of the present invention, at least the part of the aggregated spoofing information is output to one or more of the following:

- to one or more mobile devices for use in offline positioning;
- to at least one location-based service; and
- to at least one cloud-based positioning service (e.g. that is performed based on at least one positioning request received from a respective mobile device);
  so that it is enabled to respond to spoofing attempts regardless of one or more capabilities of the respective mobile devices and/or services.

Further, at least the part of the aggregated spoofing information that is output to one or more mobile devices for use in offline positioning may for instance be output dependent upon one or more radio capabilities of the respective one or more mobile devices. In this way, data for the relevant radios of the respective one or more mobile device is sent only.

A respective radio measurement of the one or more pieces of radio measurements may for instance be gathered by measuring one or more radio signals of one or more radio nodes that are observable at the location at which the measurement is performed and/or controlled by the at least one mobile device performing and/or controlling the method according to the second exemplary aspect of the present invention. Such a measurement may for instance be based, at least partially, on one or more radio signals of the one or more radio nodes. Additionally or alternatively, such a measurement may for instance be based on one or more signals of a cell, e.g. a base station of a cellular communication network currently providing cellular communication service(s) to the respective mobile device.

After the one or more radio measurements are gathered, one or more pieces of spoofing information, or a single spoofing information of (e.g. all of) the gathered one or more radio measurements may for instance be formed. Then, the spoofing information, or the one or more pieces of spoofing information, may for instance be output, e.g. by providing the spoofing information to a server or a server cloud (e.g. the server or the server cloud performing and/or controlling the method according to the first exemplary aspect of the present invention). A respective spoofing information may for instance be output by transmitting the respective spoofing information, e.g. via a communication interface comprised by or connectable to the at least one mobile device.

Further, the one or more radio measurements may for instance be stored locally at the at least one mobile device prior to the outputting of formed spoofing information.

For instance, the forming of spoofing information may for instance comprise generating the spoofing information by incorporating the one or more radio measurements that were gathered into the spoofing information, to name but one non-limiting example. Further, in order to form spoofing information, e.g. the gathered one or more radio measurements may for instance be analyzed, e.g. by the at least one mobile device, to determine whether or not one or more parameters comprised or represented by the gathered one or more radio measurements, and based on which positioning is performed and/or controlled is considered to be at least partially unexpected. Then, e.g. one or more identifiers of the affected—thus considered that positioning involving such radio node(s) is considered to be at least partially unexpected—radio node(s) may for instance be comprised or represented by the formed spoofing information.

Additionally or alternatively to outputting formed spoofing information, e.g. the one or more radio measurements that were gathered may for instance be output. Then, e.g. the aforementioned determining whether or not one or more parameters comprised or represented by the output spoofing information, or alternatively, the output one or more radio measurements, may for instance be performed and/or controlled by the apparatus that then has obtained the output spoofing information respectively one or more radio measurements, e.g. as information or data. This may for instance be performed and/or controlled by the apparatus configured to perform and/or control the method according to the first exemplary aspect of the present invention.

According to an exemplary embodiment of the second exemplary aspect of the present invention, the method further comprises:

- obtaining (e.g. receiving) at least a part of aggregated spoofing information dependent upon a radio-type information, frequency-band information, area, or a combination thereof associated with the at least one mobile device (e.g. in response to the outputting of the spoofing information, and/or a current position, e.g. represented by a position estimate of the at least one mobile device); and
- storing or updating the one or more pieces of aggregated spoofing information (e.g. in a locally maintained database of the at least one mobile device) for usage in a positioning.

The one or more pieces of aggregated spoofing information may for instance be stored e.g. for later use for positioning. E.g. in case the at least one mobile device enters again an area within which one or more affected radio nodes are located, wherein the locally maintained database is utilized to identify such one or more affected radio nodes, one or more actions may for instance be performed by the at least one mobile device.

According to an exemplary embodiment of the second exemplary aspect of the present invention, the method further comprises one or more of the following actions i) to iii):
  i) blocking the at least one affected radio node from being utilized for a positioning;
  ii) blocking a frequency-band associated with the at least one affected radio node from being utilized for a positioning based at least partially on the frequency-band information associated with the at least one affected radio node; and
  iii) blocking a radio type associated with the at least one affected radio node from being utilized for a positioning based at least partially on the radio-type information associated with the at least one affected radio node.

The at least one affected radio node may for instance be identified based on an identifier information comprised by at least the part of the obtained (e.g. received) aggregated spoofing information of at least one affected radio node. Then, in case one or more radio signals and/or one or more radio signal parameters are intended to be used when e.g. determining a position estimate by at least one mobile device, at least one of the action i) to iii) can be performed e.g. to avoid a fraudulent position estimate to be determined.

According to an exemplary embodiment of all aspects of the present invention, each respective radio node of one or more radio nodes and/or of the one or more radio nodes located within the one or more areas in which the at least one affected radio node is located, and that is equal to a corresponding frequency-band information and/or radio-type information to the blocked frequency-band information and/or radio-type is identified as a further affected radio node, wherein the respective further affected radio node is blocked from being utilized for a positioning.

For instance, the at least one affected radio node can be blocked according to action i). Then, simply all of the radio signals and/or radio signal parameters that stem from this affected radio node are ignored when the position estimate is determined. As described above, further according action ii) or iii), a certain frequency spectrum can be blocked based on the respective frequency-band information, or a certain type of radio nodes can be blocked based on the respective radio-type information.

According to an exemplary embodiment of the second exemplary aspect of the present invention, prior to the obtaining of the one or more pieces of aggregated spoofing information, the method further comprises:
  providing a position estimate indicative of the position of the at least one mobile device; wherein the one or more pieces of aggregated spoofing information are obtained based on the position estimate so that the one or more pieces of aggregated spoofing information are related to the position according to the position estimate of the at least one mobile device.

The position estimate may for instance be provided e.g. to a server or a server cloud (e.g. the server or the server cloud performing and/or controlling the method according to the first exemplary aspect of the present invention) that stores a database comprising aggregated spoofing information.

Further, such a position estimate may for instance be indicative of an area in which the at least one mobile device is positioned. Then, e.g. at least the part of aggregated spoofing information that is obtained may be dependent upon the position that is represented by the provided position estimate.

According to an exemplary embodiment of the second exemplary aspect of the present invention, the position estimate is accompanied by a capability information indicative of one or more capabilities i) to ii) of the at least one mobile device:
  i) radio-type of the at least one mobile device; and
  ii) frequency-band of the at least one mobile device.

Such a frequency-based information may for instance be utilized to identify a specific frequency-band that is considered to be under influence. Further, it will be understood that a respective frequency-band information may for instance be associated with a certain radio-type information. Thus, the frequency-band information may for instance represent a specific spectrum (also referred to as frequency-band in the following of this description) that is considered to be under influence. In conjunction with a certain radio-type information, it may for instance further be specified which radio-type transmits (a) radio signal(s) and/or (a) radio signal parameter(s) using the spectrum of the frequency-band information.

According to an exemplary embodiment of all aspects of the present invention, the frequency-band information is indicative of one of the following frequency bands:
  short-range frequency-band;
  long-range frequency-band.

For instance, a respective frequency band information may represent a 2.4 GHz spectrum, and a respective radio-type information may represent WiFi-Radio. Thus, e.g. radio signals and/or radio signal parameters transmitted by WiFi access points using the 2.4 GHz spectrum can be considered to be under the influence, in case this information is represented by the database accordingly, to name but one non-limiting example.

For instance, in the maintained database, a respective identifier of a certain radio node may for instance be associated with (e.g. linked to) one or more further pieces of information, e.g. wherein such an information may for instance be a frequency-band information.

According to an exemplary embodiment of the second exemplary aspect of the present invention, the gathering, outputting and obtaining is performed and/or controlled in real-time or in near real-time.

The term real-time, as used herein, is considered to comprise that the steps of the gathering, outputting and obtaining are performed and/or controlled so that the processing to have one or more result(s) available is finished within a specified period of time. Further, the term near real-time, as used herein, refers to a specified period of time that is in particular longer than the specified period of time defined by the term real-time. Further, the term near real-time, as used herein, may additionally refer to that the processing to have one or more result(s) available of the steps of the gathering, outputting and obtaining are dependent to be finished upon pre-determined time intervals, at which the results may be available, e.g. every 10, 20, 30, or more seconds, to name but a few non-limiting examples.

According to an exemplary embodiment of the second exemplary aspect of the present invention, the method further comprises:
  determining one or more affected radio nodes at least partially based on the gathered one or more radio measurements, wherein the spoofing information is formed further based on the one or more affected radio nodes, wherein the output spoofing information comprises at least a respective identifier of each radio node of the one or more affected radio nodes.

Identifying of radio signals and/or radio signal parameters as potentially manipulated may allow the mobile device and/or other devices to recognize radio signals and/or radio signal parameters which have already been considered as potentially manipulated before. For example, the mobile device or the remote device may maintain a database (e.g. a black list) for storing (e.g. collecting) manipulation information identifying radio signals and/or radio signal parameters as potentially manipulated.

Then, the spoofing information may not comprise the one or more radio measurements, but instead only the malicious radio nodes. Of course, alternatively, the output spoofing information may comprise both the one or more radio measurements and the malicious radio nodes.

The features and example embodiments of the invention described above may equally pertain to the different aspects according to the present invention.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE DRAWINGS

In the figures show:

FIG. 2b is a flowchart illustrating an exemplary embodiment of a method according to the first exemplary aspect of the present invention, which may for instance be performed and/or controlled in addition to the flowchart of FIG. 2a;

FIG. 3b-c are respective flowcharts illustrating an exemplary embodiment of a method according to the second exemplary aspect of the present invention, which may for instance be performed and/or controlled in addition to the flowchart of FIG. 2a;

DETAILED DESCRIPTION OF SOME EXEMPLARY EMBODIMENTS

The following description serves to deepen the understanding of the present invention and shall be understood to complement and be read together with the description as provided in the above summary section of this specification.

Figure 1:
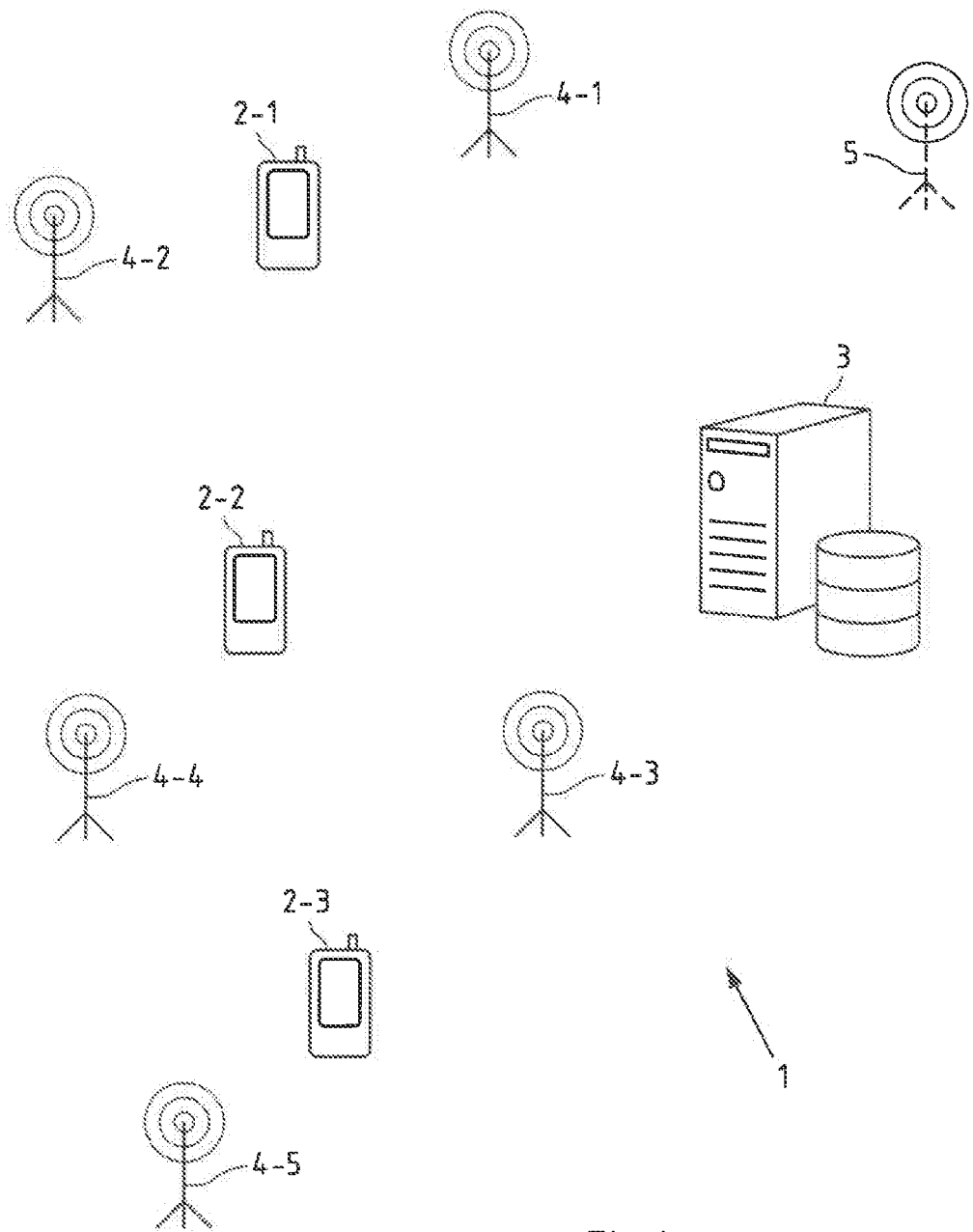
FIG. 1 is a block diagram of an exemplary embodiment of a system according to the third exemplary aspect of the present invention.

FIG. 1 is a schematic high-level block diagram of a system 1 according to an exemplary aspect of the present invention. In the following, it is assumed that system 1 is a non-GNSS based radio positioning system for a predetermined environment like a venue (e.g. building or a complex of buildings, such as a shopping center, a parking garage, an airport, a company site, etc.).

For example, each of mobile devices 2-1 to 2-3 may be one of a smartphone, a tablet computer, a notebook computer, a smart watch, a smart band, and an IoT device. Mobile devices 2-1 to 2-3 may be enabled for or support non-GNSS based radio positioning system 1.

System 1 comprises an affected (e.g. spoofed) radio node 5, which may for instance be installed by a fraudulent third party in the venue. Thus, this radio node 5 may for instance employ a manipulation technique like spoofing, jamming and/or meaconing in the venue so that position estimates determined in the venue under consideration of radio signals and/or radio signal parameters of this radio node 5 comprise or represent a false position.

System 1 comprises a positioning server 3 and a plurality of optional radio nodes 4-1 to 4-5.

System 1 is not limited to a single positioning server 3, but may optionally comprise a plurality of servers (e.g. forming a server cloud). Accordingly, positioning server 3 may be part of such a plurality of servers (e.g. a server cloud) or may be represented by such a plurality of servers (e.g. a server cloud).

For exemplary purposes and without limiting the scope of the invention, it is assumed in the following that radio nodes 4-1 to 4-5 are dedicated position support radio nodes in the form of BLE beacons 4-1 to 4-5 fixedly installed in the predetermined environment of system 1. However, system 1 may comprise further radio nodes or BLE beacons. In the following, it is thus referred to BLE beacons 4-1 to 4-5 without limiting the scope of the invention. As disclosed below in more detail, each of BLE beacons 4-1 to 4-5 may be configured to automatically and repeatedly transmit a respective BLE radio signal like an advertisement signal. The BLE radio signals transmitted by radio nodes 4-1 to 4-5 may contain and/or represent positioning support information which are configured to enable mobile devices 2-1 to 2-3 to estimate their position at least partially based on this positioning support information. An example of such positioning support information is an identifier like an UUID of the respective one of radio nodes 4-1 to 4-5 transmitting the respective radio signal containing this positioning support information.

In the training stage of system 1, mobile devices like mobile devices 2-1 to 2-3 may collect radio fingerprint observation reports indicating an observation position within the predetermined environment and the UUIDs contained in or represented by the BLE radio signals transmitted by BLE beacons 4-1 to 4-5 observable at the observation position. The collected radio fingerprint observation reports may be provided (e.g. transmitted) by the mobile devices to positioning server 3 for determining a radio map.

For example, the radio map may be configured to enable mobile devices 2-1 to 2-3 to determine (e.g. estimate) their position at least partially based on this radio map when the mobile devices are located within the predetermined environment of system 3 (i.e. the area covered by the radio map). For example, the radio map is represented by radio map information which may be provided (e.g. transmitted) by a positioning server 1 to mobile devices 2-1 to 2-3 and/or which may be hold available by mobile device 2-1 to 2-3 (e.g. stored in a memory of mobile devices 2-1 to 2-3). For example, the radio map contains or represents a respective radio model for each of BLE beacons 4-1 to 4-5. Moreover, the radio map may represent the respective installation position of each of BLE beacons 4-1 to 4-5. As disclosed above, a respective radio model for a respective BLE beacon of BLE beacons 4-1 to 4-5 may be understood to represent at least the expected radio coverage of the respective radio node. For example, the radio model of such a BLE beacon may at least describe the coverage area within which radio signals transmitted by this radio node are expected to be observable.

In the positioning stage, mobile devices 2-1 to 2-3 may use the radio map to determine (e.g. estimate) their position at least partially based on radio signal parameters of observable radio signals. For example, if mobile device 2-1 obtains radio signal parameters (e.g. UUIDs, received signal strength value/indicator, etc.) of three BLE radio signals transmitted by BLE beacons 4-1, 4-2 an 4-3 when scanning for observable radio signals at its present position, it may for example determine (e.g. estimate) by use of the radio map that its presents position is within the overlapping region of the coverage areas described by the radio models of BLE beacons 4-1, 4-2 an 4-3.

As discussed above, non GNSS-based radio positioning systems like system 1 may be affected by manipulating radio signals that are used for positioning purposes during the positioning stage. Manipulation techniques may for example be spoofing or jamming of such radio signals as described above in more detail. For example, an attacker may install the affected (e.g. spoofed) radio node 5 in a certain area to deceive mobile devices 2-1 to 2-3 to cause them to determine to be located within the overlapping region of the coverage areas described by the radio models of BLE beacons 4-1, 4-2 an 4-3. The spoofing radio node 5 may be configured to (e.g. automatically and/or repeatedly) transmit spoofed BLE radio signals containing or representing the UUIDs of BLE beacons 4-1, 4-2 and 4-3. If mobile devices 2-1 to 2-3 determine (e.g. estimate) their position at least partially based on radio signal parameters of these spoofed BLE radio signals, they may determine (e.g. estimate) their position to be within the overlapping region of the coverage areas described by the radio models of BLE beacons 4-1, 4-2 an 4-3 even though they may be located in an entirely different area.

Example embodiments according to all aspects of the present invention enable the mobile devices 2-1 to 2-3 to determine e.g. identifying information indicative of one or more radio nodes (e.g. the radio node 5) and/or of one or more areas within which the one or more radio nodes (e.g. the radio node 5) are located, wherein each respective radio node of the one or more radio nodes is configured to enable positioning based on radio signals sent by the respective radio node, wherein said positioning enabled by the respective radio node is considered to be at least partially unexpected. Such information comprising each respective radio node of the one or more radio nodes that is configured to enable positioning based on radio signals sent by the respective radio node, wherein said positioning enabled by the respective radio node is considered to be at least partially unexpected, may for instance be determined by the mobile devices 2-1 to 2-3 at least partially on one or more radio measurements that are respectively gathered by the mobile devices 2-1 to 2-3. Then, e.g. the respectively mobile devices 2-1 to 2-3 may for instance form a respective spoofing information comprising e.g. each respective identifier of each respective radio node of the one or more radio nodes that is observable by the respective mobile device. Then, each of the mobile device 2-1 to 2-3 may for instance output the formed spoofing information to a server, e.g. positioning server 3.

Positioning server 3 may for instance maintain, e.g. store a database comprising aggregated spoofing information, wherein the aggregated spoofing information are aggregated at least partially based on one or more pieces of spoofing information that are obtained by the positioning server 3 prior to the aggregation. At least a part of such stored aggregated spoofing information may for instance be provided by the positioning server 3 to at least one of the mobile device 2-1 to 2-3. In this way, e.g. a respective mobile device of the mobile device 2-1 to 2-3 can utilize at least the part of the aggregated spoofing information with which it was provided, e.g. when determining (e.g. estimating) a position so that e.g. spoofed BLE beacons (e.g. radio node 5 of all radio nodes 4-1 to 4-5 and 5) may for instance be identified and e.g. blocked so that the respective blocked BLE beacon (s) may for instance be not considered for determining (e.g. estimating) the positon of the respective mobile device.

Figure 2A:
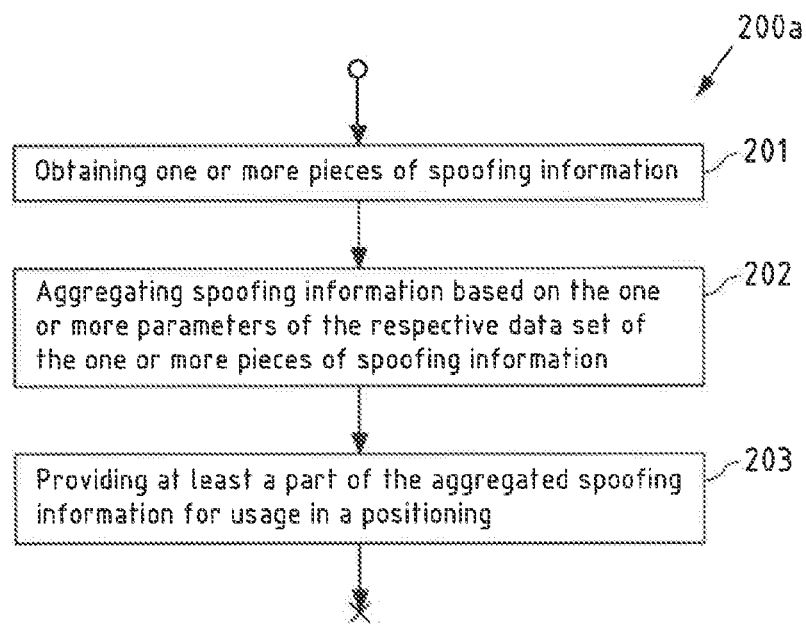
FIG. 2a is a flowchart illustrating an exemplary embodiment of a method according to the first exemplary aspect of the present invention.

FIG. 2a is a flowchart 200a showing an example embodiment of a method according to the first exemplary aspect of the present invention. This flowchart 200a may for instance be performed by a server or a server cloud, e.g. server 3 of FIG. 1.

In a first step 201, one or more pieces of spoofing information are obtained. The one or more pieces of spoofing information may for instance be obtained by receiving the one or more pieces of spoofing information, e.g. from one or more mobile devices (e.g. mobile device 2-1 to 2-3 of FIG. 1). Also, one or more pieces of spoofing information may for instance be obtained from other sources, e.g. other positioning servers (not shown in FIG. 1), or other electronic devices, such as IoT-devices, portable navigation devices, smartwatches, to name but a few non-limiting examples. The one or more pieces of spoofing information may for instance be received directly e.g. from the mobile devices, or alternatively, from entities that are different e.g. from the mobile devices, and which relay the one or more pieces of spoofing information to the server.

In a second step 202, one or more pieces of spoofing information are aggregated. The one or more pieces of spoofing information that are aggregated may for instance be the one or more pieces of spoofing information obtained in step 201. The one or more pieces of spoofing information may for instance be aggregated by a processor (e.g. processor 410 in case flowchart 200a is performed and/or controlled by apparatus 400 of FIG. 4 which represents a server).

In a third step 203, at least a part of the aggregated spoofing information is provided for usage in a positioning, e.g. a location-based service. The aggregated spoofing information, e.g. stored in a memory (e.g. data memory 440 in case flowchart 200a is performed and/or controlled by apparatus 400), or at least a part of it, may for instance be provided, e.g. to other entities, such as one or more of the mobile devices 2-1 to 2-3 of FIG. 1. The aggregated spoofing information, or at least a part of it, may for instance be provided by outputting them, e.g. via a communication interface (e.g. communication interface(s) 450 in case flowchart 200a is performed and/or controlled by apparatus 400 of FIG. 4 which represents a server).

Figure 2B:
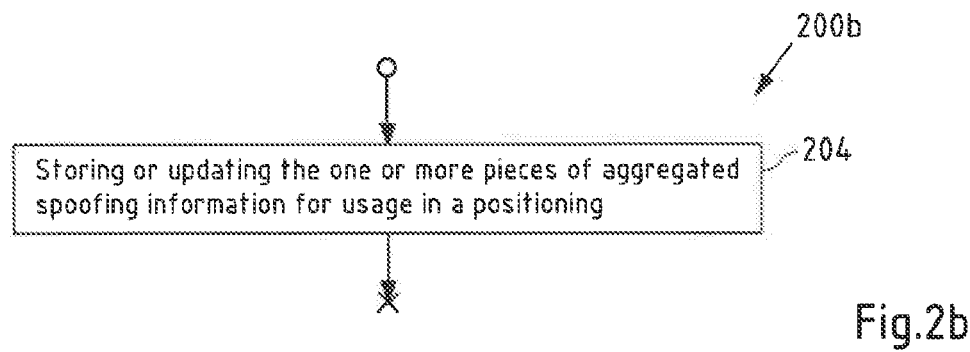

FIG. 2b is a flowchart 200b showing an example embodiment of a method according to the first exemplary aspect of the present invention. This flowchart 200b may for instance be performed by a server or a server cloud, e.g. server 3 of FIG. 1. The flowchart 200b may for instance be performed in addition to the flowchart 200a of FIG. 2a. The further step 204 may for instance be performed in parallel or after step 202 of flowchart 200a of FIG. 2a.

In an optional step 204, one or more pieces of aggregated spoofing information are stored or updated. The aggregated spoofing information, e.g. comprising one or more pieces of aggregated spoofing information are e.g. stored in a memory (e.g. data memory 440 in case flowchart 200a is performed and/or controlled by apparatus 400). Further, e.g. 'new' spoofing information may for instance be utilized to update e.g. already stored aggregated spoofing information, e.g. by adding 'new' spoofing information, and/or cleaning outdated aggregated spoofing information at least partially based on the 'new' spoofing information.

Figure 3A:
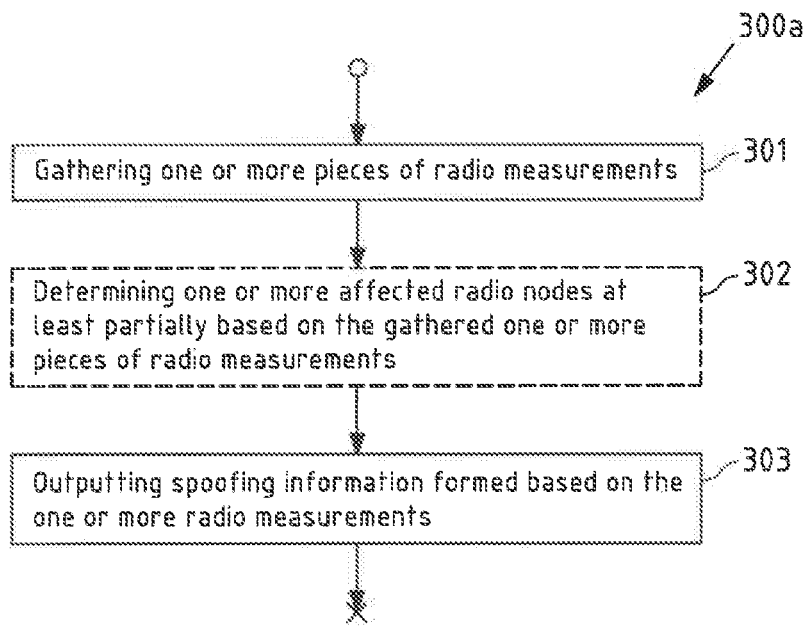
FIG. 3a is a flowchart illustrating an exemplary embodiment of a method according to the second exemplary aspect of the present invention.

FIG. 3a is a flowchart 300a showing an example embodiment of a method according to the second exemplary aspect of the present invention. This flowchart 300a may for instance be performed by a mobile device, e.g. a mobile terminal. This flowchart 300a may for instance be performed by at least one of the mobile devices 2-1 to 2-3 of FIG. 1.

In a first step 301, one or more radio measurements are gathered. The one or more radio measurements may for instance be gathered by measuring the one or more radio measurements, e.g. with sensor(s) 470 in case flowchart 300a is performed and/or controlled by apparatus 400 of FIG. 4 which represents a mobile device.

In an optional second step 302, one or more affected radio nodes are determined. The one or more affected radio nodes may for instance be determined at least partially based on the one or more radio measurements gathered in step 301. The one or more affected radio nodes may for instance be determined a processor (e.g. processor 410 in case flowchart 300a is performed and/or controlled by apparatus 400 of FIG. 4 which represents a mobile device).

In a third step 303, one or more pieces of spoofing information that are formed based on the one or more radio measurements are provided, e.g. to another entity, e.g. a server or a server cloud (e.g. server 3 of FIG. 1). The one or more pieces of spoofing information may for instance be provided by outputting them, e.g. via a communication interface (e.g. communication interface(s) 450 in case flowchart 300a is performed and/or controlled by apparatus 400 of FIG. 4 which represents a mobile device).

Figure 3B:
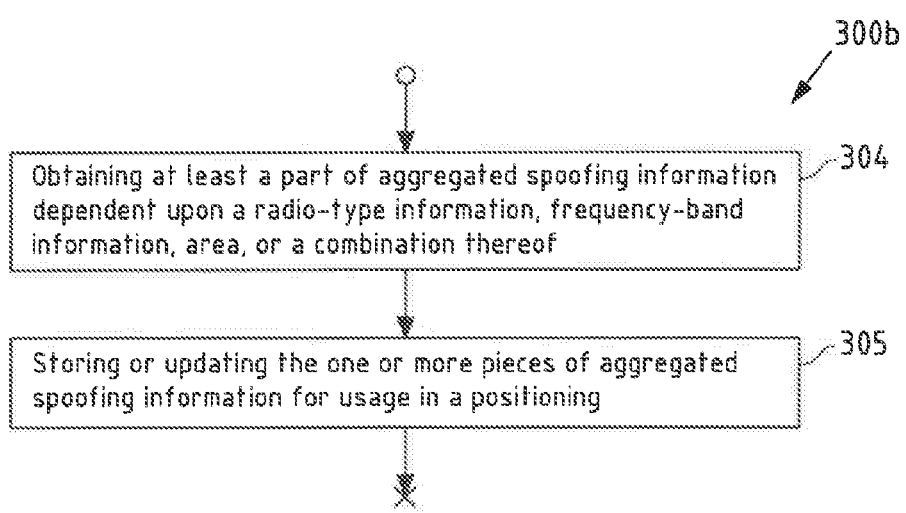

FIG. 3b is a flowchart 300b showing an example embodiment of a method according to the second exemplary aspect of the present invention. This flowchart 300b may for instance be performed by a mobile device, e.g. a mobile terminal. This flowchart 300b may for instance be performed by at least one of the mobile devices 2-1 to 2-3 of FIG. 1. The flowchart 300b may for instance be performed in addition to the flowchart 300a of FIG. 3a. Any of the further steps 304 and 305 may for instance be performed in parallel or before or after any of the steps 301 to 303 of flowchart 300a of FIG. 3a.

In a step 304, at least a part of aggregated spoofing information, or the aggregated spoofing information is/are obtained. At least a part of aggregated spoofing information, or the aggregated spoofing information is/are obtained by receiving at least the part of aggregated spoofing information, or the aggregated spoofing information, e.g. from a server or a server cloud (e.g. server 3 of FIG. 1). At least a part of aggregated spoofing information, or the aggregated spoofing information may for instance be received directly e.g. from the server, or alternatively, from an entity that is different e.g. from the server, and which relays at least a part of aggregated spoofing information, or the aggregated spoofing information to the mobile device.

In a step 305, the one or more pieces of aggregated spoofing information are stored or updated for a usage in a positioning, e.g. a location-based service. Such one or more pieces of spoofing information, e.g. at least a part of aggregated spoofing information, or aggregated spoofing information, may for instance be stored, e.g. in a memory that is locally comprised by the mobile device, or that is connectable to the mobile device. Such a memory that is locally comprised by the mobile device may for instance be data memory 440 in case flowchart 300b is performed and/or controlled by apparatus 400 of FIG. 4 which represents the mobile device.

Figure 3C:
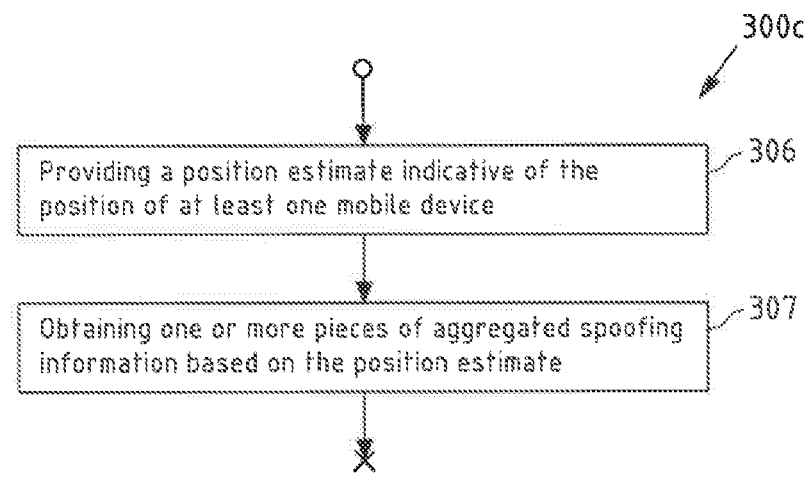

FIG. 3c is a flowchart 300c showing an example embodiment of a method according to the second exemplary aspect of the present invention. This flowchart 300c may for instance be performed by a mobile device, e.g. a mobile terminal. This flowchart 300c may for instance be performed by at least one of the mobile devices 2-1 to 2-3 of FIG. 1. The flowchart 300c may for instance be performed in addition to the flowchart 300a of FIG. 3a, and/or further, in addition to flowchart 300b of FIG. 3b. Any of the further steps 306 and 307 may for instance be performed in parallel or after the steps 302 to 303 of flowchart 300a of FIG. 3a, or in parallel, before, or after any of the steps 304 to 305 of flowchart 300b of FIG. 3b.

In a step 306, a position estimate is provided. For instance, prior to providing the position estimate, e.g. the mobile device may for instance determine or trigger a determination of the position estimate. For instance, based on a gathered fingerprint information (e.g. a radio fingerprint observation report) it may for instance be enabled to determine the position estimate. The mobile device may for instance determine the position estimate by itself, or trigger e.g. a positioning server to perform and/or control the determination of the position estimate. Then, the position estimate may for instance be provided by outputting the position estimate, e.g. to a server or a server cloud (e.g. server 3 of FIG. 1).

In a step 307, one or more pieces of aggregated spoofing information are obtained based on the position estimate of step 306. Then, e.g. in response to the provided position estimate of step 306, one or more pieces of aggregated spoofing information are obtained, e.g. by receiving the one or more pieces of aggregated spoofing information. For instance, only those pieces of aggregated spoofing information that are e.g. stored by a server or server cloud (e.g. server 3 of FIG. 1) performing and/or controlling the method according to the first exemplary aspect of the present invention may be provided to the mobile device which may be relevant to the mobile device with respect to its current position, as represented by the position estimate of step 306.

Figure 4:
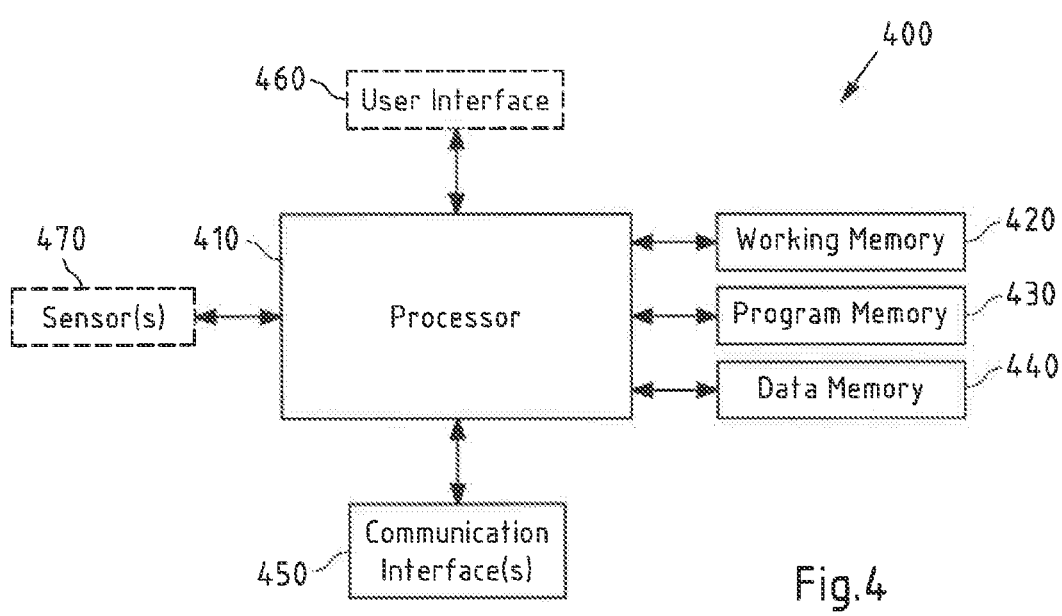
FIG. 4 is a block diagram of an exemplary embodiment of an apparatus according to all aspects of the present invention.

FIG. 4 is a schematic block diagram of an apparatus 400 according to an exemplary aspect of the present invention, which may for instance represent at least one of the mobile devices 2-1 to 2-3 of FIG. 1. Alternatively, apparatus 400 may for instance represent server 3 of FIG. 1.

Apparatus 400 comprises a processor 410, working memory 420, program memory 430, data memory 440, communication interface(s) 450, an optional user interface 460 and an optional sensor(s) 470.

Apparatus 400 may for instance be configured to perform and/or control or comprise respective means (at least one of 410 to 460) for performing and/or controlling the method according to the first exemplary aspect of the present invention. Apparatus 400 may for instance be configured to perform and/or control or comprise respective means (at least one of 410 to 470) for performing and/or controlling the method according to the second exemplary aspect of the present invention.

Apparatus 400 may as well constitute an apparatus comprising at least one processor (410) and at least one memory (420) including computer program code, the at least one memory and the computer program code configured to, with the at least one processor, cause an apparatus, e.g. apparatus 400 at least to perform and/or control the method according to the first exemplary aspect of the invention of the present invention.

Processor 410 may for instance comprise a spoofing information obtainer as a functional and/or structural unit. Spoofing information obtainer may for instance be configured to obtain one or more pieces of spoofing information (see step 201 of FIG. 2a).

Processor 410 may for instance comprise a spoofing information aggregator as a functional and/or structural unit. Spoofing information aggregator may for instance be configured to aggregate one or more pieces of spoofing information (see step 202 of FIG. 2a).

Processor 410 may for instance comprise an optional spoofing information updater as a functional and/or structural unit. Spoofing information updater may for instance be configured to update one or more pieces of aggregated spoofing information (see step 204 of FIG. 2b).

Processor 410 may for instance comprise a radio measurement gatherer as a functional and/or structural unit. Radio measurement gatherer may for instance be configured to gather one or more radio measurements (see step 301 of FIG. 3a).

Processor 410 may for instance comprise an optional spoofing information obtainer as a functional and/or structural unit. Spoofing information obtainer may for instance be configured to obtain one or more pieces of aggregated spoofing information (see step 304 of FIG. 3b).

Processor 410 may for instance comprise a further optional spoofing information updater as a functional and/or structural unit. Spoofing information updater may for instance be configured to update one or more pieces of aggregated spoofing information (see step 305 of FIG. 3b).

Processor 410 may for instance comprise an optional affected radio node determiner as a functional and/or structural unit. Affected radio node determiner may for instance be configured to determine one or more affected radio nodes (see step 302 of FIG. 3a).

Processor 410 may for instance further control the memories 420 to 440, the communication interface(s) 450, the optional user interface 460 and the optional sensor(s) 470.

Processor 410 may for instance execute computer program code stored in program memory 430, which may for instance represent a computer readable storage medium comprising program code that, when executed by processor 410, causes the processor 410 to perform the method according to the first exemplary aspect of the present invention.

Processor 410 (and also any other processor mentioned in this specification) may be a processor of any suitable type. Processor 410 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 410 may for instance be an application processor that runs an operating system.

Program memory 430 may also be included into processor 410. This memory may for instance be fixedly connected to processor 410, or be at least partially removable from processor 410, for instance in the form of a memory card or stick. Program memory 430 may for instance be non-volatile memory. It may for instance be a FLASH memory (or a part thereof), any of a ROM, PROM, EPROM and EEPROM memory (or a part thereof) or a hard disc (or a part thereof), to name but a few examples. Program memory 430 may also comprise an operating system for processor 410. Program memory 430 may also comprise a firmware for apparatus 400.

Apparatus 400 comprises a working memory 420, for instance in the form of a volatile memory. It may for instance be a Random Access Memory (RAM) or Dynamic RAM (DRAM), to give but a few non-limiting examples. It may for instance be used by processor 410 when executing an operating system and/or computer program.

Data memory 440 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 440 may for instance store one or more pieces of identifying information, or the like, to name but a few non-limiting examples.

Communication interface(s) 450 enable apparatus 400 to communicate with other entities, e.g. with server 3 of FIG. 1, or with other mobile devices 2-1 to 2-3 of FIG. 1. The communication interface(s) 450 may for instance comprise a wireless interface, e.g. a cellular radio communication interface and/or a WLAN interface) and/or wire-bound interface, e.g. an IP-based interface, for instance to communicate with entities via the Internet. Communication interface(s) may enable apparatus 400 to communicate with further, for instance with radio nodes 4-1 to 4-5.

User interface 460 is optional and may comprise a display for displaying information to a user and/or an input device (e.g. a keyboard, keypad, touchpad, mouse, etc.) for receiving information from a user.

Sensor(s) 470 are optional and may for instance comprise a barometric sensor, e.g. to gather pressure information. Such pressure information may for instance enable three-dimensional positioning, since a respective pressure information may be indicative of an absolute or relative altitude (e.g. height above sea level) value.

Some or all of the components of the apparatus 400 may for instance be connected via a bus. Some or all of the components of the apparatus 400 may for instance be combined into one or more modules.

Figure 5:
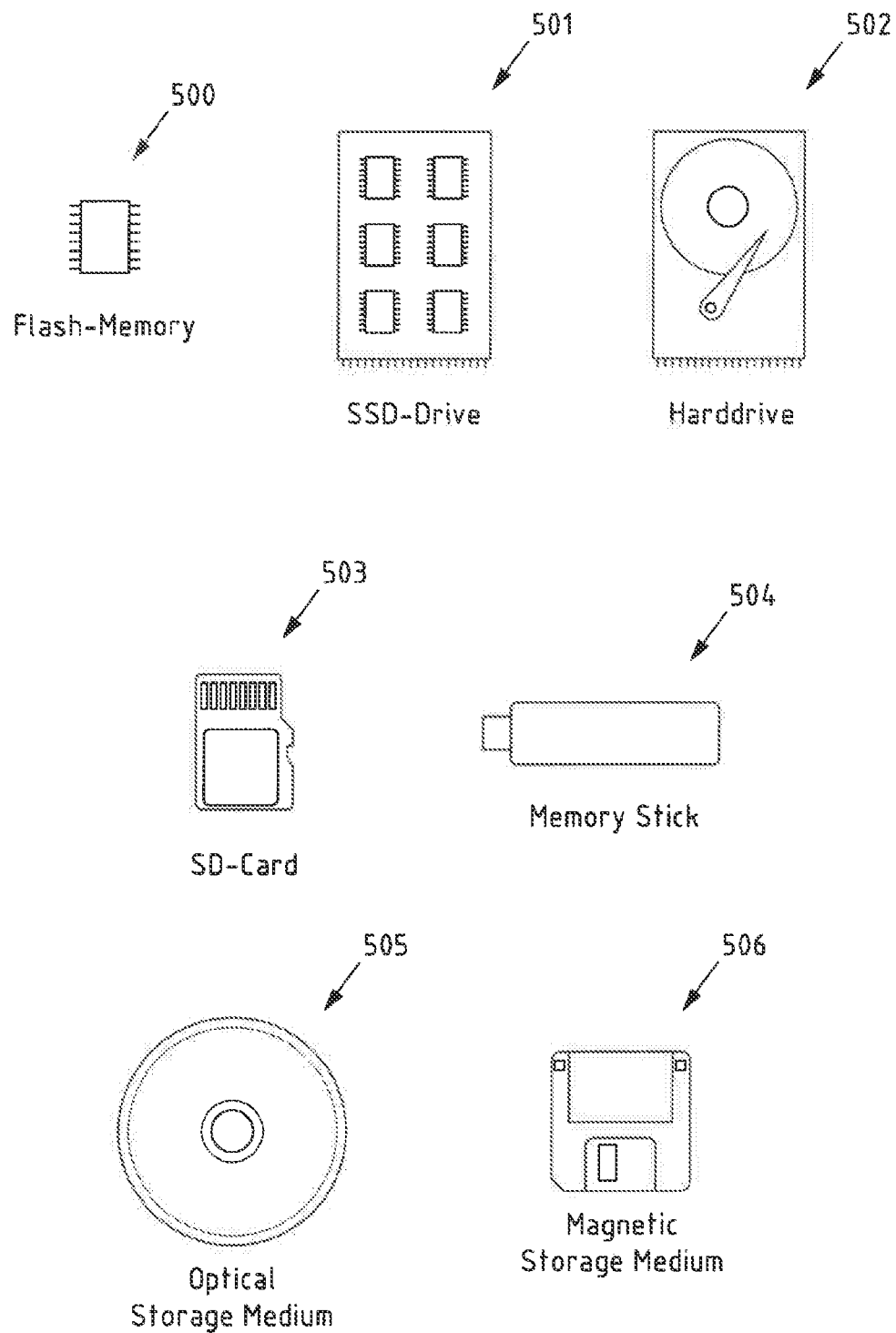
FIG. 5 is a schematic illustration of examples of tangible and non-transitory storage media according to the present invention.

FIG. 5 is a schematic illustration of examples of tangible and non-transitory computer-readable storage media according to the present invention that may for instance be used to implement one or more of the memories 420, 430 of FIG. 4. To this end, FIG. 5 displays a flash memory 500, which may for instance be soldered or bonded to a printed circuit board, a solid-state drive 501 comprising a plurality of memory chips (e.g. Flash memory chips), a magnetic hard drive 502, a Secure Digital (SD) card 503, a Universal Serial Bus (USB) memory stick 504, an optical storage medium 505 (such as for instance a CD-ROM or DVD) and a magnetic storage medium 506.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (1) to a combination of processor(s) or (2) to sections of processor(s)/software (including digital signal processor(s)), software, and memory(ies) that work together to cause an apparatus, such as a mobile phone, to perform various functions) and
(c) to circuits, such as a microprocessor(s) or a section of a microprocessor(s), that re-quire software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 310 of FIG. 3, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

The following embodiments shall also be considered to be disclosed:

To make the detection/mitigation more powerful, all kinds of devices can benefit from further help. The help may be implemented by distributing information between the devices.

Example embodiments according to all aspects of the present invention enable a method comprising:
providing spoofing/jamming/meaconing information as stored locally to a cloud in near real-time;
aggregating information in the cloud from a multitude of devices;
distributing the aggregated spoofing/jamming/meaconing information e.g. back to the devices (same or different) so that they can better respond to spoofing/jamming/meaconing attempts regardless of device capabilities.

Locally stored database(s) respectively information (e.g. reports) comprised by such (a) database(s) is one type of data the respective device(s) could report e.g. to a cloud for aggregation. However, spoofing/jamming/meaconing may sometimes last only a short time meaning that reporting of detections must be almost real-time.

Therefore, just sending a dump of the database e.g. every week does not work. Thus, it typically makes sense to report only very fresh records (having said that, there may be valid use cases, where historical data makes sense too—e.g. collecting long-term statistics about the attempts).

Alternatively to sending fresh database records to the database, one might also consider sending rawer data sets to the cloud. At the extreme, those can be raw radio measurements (identities, signal strengths, other measurements) that the device thinks are suspicious.

In the server side the important action may be to aggregate data from multiple sources to keep spoofing/jamming/meaconing data fresh, and to distribute the data back to the clients as well as for the component responsible for cloud-based positioning.

When dealing with geospatial data, this can be arranged in a simple manner to a geospatial index. Adding new data to such a database can be performed and/or controlled straightforward as the data comes in. The data contents may be:
radio types (WiFi, Bluetooth, Cellular, etc.) under influence;
radio bands (2.4 GHz WiFi, 5 GHz WiFi, etc.) under influence;
type of influence (spoofing/jamming/meaconing);
identities of radio nodes under influence;
whether the influence detection is reliable/uncertain;
if the influence is continuous/sporadic/periodic.

A server or server cloud aggregating the data contents may for instance take care of amending this data, but also clean it up and remove no longer valid or too old data. For example, if there are no spoofing/jamming/meaconing reports for a given area in a defined time period, the spoofing information for that area may be cleared. A possible implementation is also that the devices report, in addition to detected spoofing attempts, no-detection data so that e.g. the server also receives information on clean areas.

To make the database useful, subsets of the database may for instance be transferred to the device(s). Obviously, a single device does not require the full global database. Thus, when the device retrieves the spoofing database from the cloud, the device may provide e.g. an indication of its location so that the server or server cloud can return relevant data for the surroundings of the device to keep the data amounts low. Moreover, in the request the device(s) may also state its radio capabilities so that data only for the relevant radios is sent to the device(s).

When the device(s) receives this data from the server or the server cloud, the device(s) may store the data for later use for positioning. The device(s) may take at least one of several actions, e.g. listed in the following. For instance, when the device again enters the area of influence, the device may take at least one of the following actions:
The sensitivity of spoofing/meaconing detection can be increased. This will increase the probability of detecting a spoofing attempt. This will also increase the rate of false positives, but this is acceptable under risky conditions.
Block affected radio transmitters, radio types and radio bands from positioning.
Trust more on non-spoofable methods such as inertial and magnetic sensors.

It is mentioned that in some case the device(s) might also have a local spoofing database, wherein such a local database may for instance have the equal features as described with the database comprising aggregated spoofing information. In such a case, the device(s) may for example selectively replace records in the local database by comparing timestamps—newer data replaces old data.

Another use for the server- or server cloud-based spoofing database is cloud-based positioning. Positioning can be performed either in online or offline modes. The implementation described above may for instance be related to offline positioning in the (e.g. mobile) device(s).

Likewise, spoofing is a risk for online positioning, too. The server- or cloud-based spoofing database can significantly mitigate the risk. When a device sends radio measurements to the server or server cloud to retrieve the device location, the cloud-based positioning component will access the radio map database for positioning purposes. Additionally, when a spoofing database is available, the component can retrieve spoofing data for the device whereabouts to understand, if the positioning component needs to e.g. block some radio types completely from positioning. The set of actions the cloud-based positioning component can do may for instance more-or-less be the same, as described above with respect to the at least one of the actions the device(s) may for instance perform and/or control.

Collecting spoofing/jamming/meaconing data to the server or server cloud enables distributing information on spoofing attempts over a large device base—also to devices that don't have organic capabilities for spoofing detection. Moreover, the cloud-based spoofing database is also an invaluable factor in making cloud-based positioning secure.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program/system) may also be used in a corresponding manner in an example embodiment of any other category. It should also be understood that presence of a feature in the presented example embodiments shall not necessarily mean that this feature forms an essential feature of the invention and cannot be omitted or substituted.

The statement of a feature comprises at least one of the subsequently enumerated features is not mandatory in the way that the feature comprises all subsequently enumerated features, or at least one feature of the plurality of the subsequently enumerated features. Also, a selection of the enumerated features in any combination or a selection of only one of the enumerated features is possible. The specific combination of all subsequently enumerated features may as well be considered. Also, a plurality of only one of the enumerated features may be possible.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

That which is claimed is:

1. A method, performed by at least one apparatus, comprising:
   obtaining one or more pieces of spoofing information indicative of a data set enabling positioning based on radio signals sent by a respective radio node, and wherein the data set is further indicative of one or more parameters based on which said positioning is performed and/or controlled and which is considered to be at least partially unexpected;
   aggregating spoofing information based on the one or more parameters of the respective data set of the one or more pieces of spoofing information; and
   providing at least a part of the aggregated spoofing information for usage in a positioning, wherein the providing comprises providing at least a part of the aggregated spoofing information to at least one device or service to enable a recipient of the at least a part of the aggregated spoofing information to respond to spoofing attempts, the at least a part of the aggregated spoofing information corresponding to radio capabilities of the recipient.

2. The method according to claim 1, wherein said positioning and a position estimated by said positioning are considered to be at least partially unexpected if the positioning is considered to be potentially manipulated.

3. The method according to claim 1, further comprising storing or updating the one or more pieces of aggregated spoofing information for usage in a positioning.

4. The method according to claim 1, wherein the one or more parameters of a respective data set of the one or more pieces of spoofing information comprises or represents one or more of the following parameters i) to v):
   i) radio-type information indicative of at least one radio type that is considered to be potentially manipulated;
   ii) frequency-band information indicative of at least one frequency-band that is considered to be potentially manipulated;
   iii) an identifier of at least one radio node enabling positioning that is considered to be potentially manipulated;
   iv) influencing information indicative of a certain type of influence that is considered to be potentially manipulated and/or if a certain type of influence is continuous or sporadic or periodic; or
   v) detection information indicative of whether or not detection of manipulation is reliable or uncertain.

5. The method according to claim 4, wherein the data set further comprises a position information indicative of the at least one radio node enabling positioning that is considered to be potentially unexpected, or wherein such a position information is determined based on the identifier of at least one radio node enabling positioning that is considered to be potentially manipulated.

6. The method according to claim 1, wherein the one or more pieces of spoofing information are aggregated into a geospatial index, wherein the geospatial index comprises a plurality of areas associated with a geographic space, and wherein the data sets of the one or more pieces of spoofing information are mapped to a respective area of the plurality of areas.

7. The method according to claim 1, wherein the at least one device or service comprises:
one or more mobile devices for use in offline positioning;
at least one location-based service; or
at least one cloud-based positioning service; and
the recipient of the at least the part of the aggregated spoofing information is enabled to respond to spoofing attempts regardless of one or more capabilities of the respective mobile devices and/or services.

8. An apparatus comprising at least one processor and at least one memory including computer program code, the at least one memory and the computer program code configured to, with the at least one processor, cause said first apparatus at least to:
obtain one or more pieces of spoofing information indicative of a data set enabling positioning based on radio signals sent by a respective radio node, and wherein the data set is further indicative of one or more parameters based on which said positioning is performed and/or controlled and which is considered to be at least partially unexpected;
aggregate spoofing information based on the one or more parameters of the respective data set of the one or more pieces of spoofing information; and
provide at least a part of the aggregated spoofing information for usage in a positioning, wherein the at least a part of the aggregated spoofing information is provided to at least one device or service to enable a recipient of the at least a part of the aggregated spoofing information to respond to spoofing attempts, the at least a part of the aggregated spoofing information corresponding to radio capabilities of the recipient.

9. The apparatus according to claim 8, wherein said positioning and a position estimated by said positioning are considered to be at least partially unexpected if the positioning is considered to be potentially manipulated.

10. The apparatus according to claim 8, wherein the at least one memory and the computer program code are further configured to, with the at least one processor, cause said first apparatus at least to store or update the one or more pieces of aggregated spoofing information for usage in a positioning.

11. The apparatus according to claim 8, wherein the one or more parameters of a respective data set of the one or more pieces of spoofing information comprises or represents one or more of the following parameters i) to v):
i) radio-type information indicative of at least one radio type that is considered to be potentially manipulated;
ii) frequency-band information indicative of at least one frequency-band that is considered to be potentially manipulated;
iii) an identifier of at least one radio node enabling positioning that is considered to be potentially manipulated;
iv) influencing information indicative of a certain type of influence that is considered to be potentially manipulated and/or if a certain type of influence is continuous or sporadic or periodic; or
v) detection information indicative of whether or not detection of manipulation is reliable or uncertain.

12. The apparatus according to claim 11, wherein the data set further comprises a position information indicative of the at least one radio node enabling positioning that is considered to be potentially unexpected, or wherein such a position information is determined based on the identifier of at least one radio node enabling positioning that is considered to be potentially manipulated.

13. The apparatus according to claim 8, wherein the one or more pieces of spoofing information are aggregated into a geospatial index, wherein the geospatial index comprises a plurality of areas associated with a geographic space, and wherein the data sets of the one or more pieces of spoofing information are mapped to a respective area of the plurality of areas.

14. The apparatus according to claim 8, wherein the at least one device or service comprises:
one or more mobile devices for use in offline positioning;
at least one location-based service; or
at least one cloud-based positioning service; and
the recipient of the at least the part of the aggregated spoofing information is enabled to respond to spoofing attempts regardless of one or more capabilities of the respective mobile devices and/or services.

15. A non-transitory computer-readable storage media comprising computer program code configured to, when executed by at least one processor of an apparatus, cause the apparatus to:
obtain one or more pieces of spoofing information indicative of a data set enabling positioning based on radio signals sent by a respective radio node, and wherein the data set is further indicative of one or more parameters based on which said positioning is performed and/or controlled and which is considered to be at least partially unexpected;
aggregate spoofing information based on the one or more parameters of the respective data set of the one or more pieces of spoofing information; and
provide at least a part of the aggregated spoofing information for usage in a positioning, wherein the at least a part of the aggregated spoofing information is provided to at least one device or service to enable a recipient of the at least a part of the aggregated spoofing information to respond to spoofing attempts, the at least a part of the aggregated spoofing information corresponding to radio capabilities of the recipient.

16. The non-transitory computer-readable storage media according to claim 15, wherein said positioning and a position estimated by said positioning are considered to be at least partially unexpected if the positioning is considered to be potentially manipulated.

17. The non-transitory computer-readable storage media according to claim 15, wherein the computer program code is further configured to, when executed by the at least one processor of the apparatus, cause the apparatus to, cause said apparatus at least to store or update the one or more pieces of aggregated spoofing information for usage in a positioning.

18. The non-transitory computer-readable storage media according to claim 15, wherein the one or more parameters of a respective data set of the one or more pieces of spoofing information comprises or represents one or more of the following parameters i) to v):
i) radio-type information indicative of at least one radio type that is considered to be potentially manipulated;
ii) frequency-band information indicative of at least one frequency-band that is considered to be potentially manipulated;

iii) an identifier of at least one radio node enabling positioning that is considered to be potentially manipulated;
iv) influencing information indicative of a certain type of influence that is considered to be potentially manipulated and/or if a certain type of influence is continuous or sporadic or periodic; or
v) detection information indicative of whether or not detection of manipulation is reliable or uncertain.

19. The non-transitory computer-readable storage media according to claim 15, wherein the one or more pieces of spoofing information are aggregated into a geospatial index, wherein the geospatial index comprises a plurality of areas associated with a geographic space, and wherein the data sets of the one or more pieces of spoofing information are mapped to a respective area of the plurality of areas.

20. The non-transitory computer-readable storage media according to claim 15, wherein the at least one device or service comprises:
   one or more mobile devices for use in offline positioning;
   at least one location-based service; or
   at least one cloud-based positioning service.

* * * * *